US012697811B2

(12) United States Patent
Trip et al.

(10) Patent No.: US 12,697,811 B2
(45) Date of Patent: Aug. 4, 2026

(54) METHODS AND APPARATUS FOR DROPLET DEPOSITION

(71) Applicant: Xaar Technology Limited, Huntingdon (GB)

(72) Inventors: Renzo Trip, Huntingdon (GB); Nicholas Marc Jackson, Huntingdon (GB); Wolfgang Voit, Huntingdon (GB)

(73) Assignee: Xaar Technology Limited (GB)

(*) Notice: Subject to any disclaimer, the term of this patent is extended or adjusted under 35 U.S.C. 154(b) by 140 days.

(21) Appl. No.: 18/847,151

(22) PCT Filed: Mar. 16, 2023

(86) PCT No.: PCT/GB2023/050621
§ 371 (c)(1),
(2) Date: Sep. 13, 2024

(87) PCT Pub. No.: WO2023/175333
PCT Pub. Date: Sep. 21, 2023

(65) Prior Publication Data

US 2025/0187332 A1 Jun. 12, 2025

(30) Foreign Application Priority Data

Mar. 16, 2022 (GB) ..................................... 2203655

(51) Int. Cl.
*B41J 2/045* (2006.01)
*B41J 2/14* (2006.01)

(52) U.S. Cl.
CPC ....... *B41J 2/04588* (2013.01); *B41J 2/04581* (2013.01); *B41J 2/14209* (2013.01)

(58) Field of Classification Search
CPC . B41J 2/04588; B41J 2/04581; B41J 2/14209
See application file for complete search history.

(56) References Cited

U.S. PATENT DOCUMENTS 4,992,808 A * 2/1991 Bartky ................... B41J 2/1632 347/69
6,106,106 A * 8/2000 Nakazawa ............ B41J 2/1646 347/68

(Continued)

FOREIGN PATENT DOCUMENTS

GB 2546097 A 7/2017
GB 2584617 A 12/2020

(Continued)

*Primary Examiner* — Jason S Uhlenhake
(74) *Attorney, Agent, or Firm* — HONIGMAN LLP; Eric J. Sosenko; Jonathan P. O'Brien

(57) ABSTRACT

A method for depositing fluid droplets onto a medium. For an actuation cycle, the steps include: assigning all fluid chambers in an array as either firing or non-firing chambers to produce bands of one or more contiguous firing chambers separated by bands of one or more contiguous non-firing chambers. For each non-firing chamber adjacent to a band of firing chambers, actuating one wall in the first direction and retaining the other wall in the neutral position. For a single non-firing chamber between bands of firing chambers, actuating both walls concurrently in the first direction. For a non-firing chamber not adjacent to a band of firing chambers, retaining both walls in the neutral position or concurrently actuating both wall in either the first or second direction. And for each firing chamber, actuating the first and second walls consecutively in the first direction.

20 Claims, 10 Drawing Sheets

(56) References Cited

U.S. PATENT DOCUMENTS

| | | | | |
|---|---|---|---|---|
| 2003/0011660 | A1 * | 1/2003 | Nishi | B41J 2/14209 29/25.35 |
| 2013/0050338 | A1 * | 2/2013 | Shimosato | B41J 2/14209 29/890.1 |
| 2019/0023013 | A1 * | 1/2019 | Condie | B41J 2/0453 |

FOREIGN PATENT DOCUMENTS

| | | | |
|---|---|---|---|
| WO | 2010/055344 | A1 | 5/2010 |
| WO | 2010/055345 | A1 | 5/2010 |
| WO | 2017/118843 | A1 | 7/2017 |
| WO | 2018/224821 | A9 | 12/2018 |

* cited by examiner

METHODS AND APPARATUS FOR DROPLET DEPOSITION

FIELD OF THE INVENTION

The present invention relates to methods for depositing droplets of fluid onto a medium utilising a droplet deposition head, such as a printhead; and to droplet deposition heads and droplet deposition apparatus comprising such droplet deposition heads, which are configured to carry out such methods.

BACKGROUND TO THE INVENTION

Droplet deposition heads are now in widespread usage, whether in more traditional applications, such as inkjet printing, or in materials deposition applications, such as 3D printing and other rapid prototyping techniques, and the printing of raised patterns on surfaces, e.g. braille or decorative raised patterns. In such materials deposition applications, it may be desired to deposit a relatively large amount of fluid on a medium using droplet deposition heads. In some cases, the fluids may have novel chemical properties to adhere to new mediums and increase the functionality of the deposited material.

Recently, inkjet printheads have been developed that are capable of depositing inks and varnishes directly onto ceramic tiles, with high reliability and throughput. This allows the patterns on the tiles to be customized to a customer's exact specifications, as well as reducing the need for a full range of tiles to be kept in stock.

In still other applications, droplet deposition heads may be used to form elements such as colour filters in LCD or OLED displays, e.g. as used in flat-screen television manufacturing.

It will therefore be appreciated that droplet deposition heads continue to evolve and specialise so as to be suitable for new and/or increasingly challenging deposition applications. Nonetheless, while a great many developments have been made in the field of droplet deposition heads, there remains room for improvements in the field of droplet deposition heads.

As background to the present work, a mechanism by which droplets of fluid may be ejected from an array of fluid chambers is illustrated in FIG. 1. This shows an array 10' of fluid chambers 12 forming part of a droplet deposition head, and, underneath, a simplified representation of the same array. The chambers are bounded on one side by a substrate 15. Neighbouring fluid chambers 12 are separated by actuable side walls 14 formed of a piezoelectric material such as lead zirconate titanate (also known as PZT). The chamber 12 on each side of each piezoelectric wall 14 is coated internally with a metal layer that acts as an electrode, for applying a potential difference across the respective wall. That is to say, in this early example, within a given chamber 12 the metal electrode layer extends from the internal wall on one side of the chamber to the internal wall on the other side of the chamber. This, however, is by no means the only electrode configuration that can be used. For example, each electrode extending from the internal wall on one side of the chamber to the internal wall on the other side of the chamber may be cut (e.g. by laser) along the centre of the fluid chamber, effectively dividing the electrode into two independently-addressable electrodes (as shown in FIG. 2).

If the same potential is applied to the electrodes on either side of a given wall, such that there is no potential difference across the wall, the wall remains stationary. On the other hand, if different potentials are applied to the electrodes on either side of a given wall the wall moves by virtue of the reverse piezoelectric effect, which transforms potential difference into movement. The walls that move may be termed "active" walls, while the walls that remain stationary may be termed "non-active" walls.

FIG. 1 illustrates a simplified representation of an array of chambers where two chambers experience a decrease in their volume due to the inward movement of their walls. As a consequence, the pressure in those two chambers increases (denoted by "+"), and the pressure in neighbouring chambers decreases (denoted by "−"). If the potential difference applied across the walls is high enough (e.g. to overcome surface tension effects and losses induced by the apparatus), a droplet of fluid is forced out of the chamber that is under increased pressure ("+"), through a nozzle 16. Such chambers are referred to as "firing" chambers herein, because they eject ("fire") a droplet of fluid. FIG. 1 also shows two chambers (on the far right of the diagram) that experience no change in volume because their walls remain stationary. These chambers are called "non-firing" chambers, because they do not eject a droplet of fluid. It should be noted that the chambers denoted by "−" may be either firing chambers (since they are also capable of firing later in the same actuation cycle) or non-firing chambers (if, in the same actuation cycle, their walls do not move in a way that causes ejection). However, for the sake of simplicity, throughout the present description the firing chambers will be denoted with either "+" or "−", while the non-firing chambers will be blank as the associated increase/decrease in pressure is insufficient to cause ejection.

The chambers 12 are formed as channels enclosed on one side by a cover member 17 that contacts the actuable walls; for each chamber a nozzle 16 for fluid ejection is provided in this cover member 17. The cover member 17 may comprise a metal or ceramic cover plate, which provides structural support, and a thinner overlying nozzle plate, in which the nozzles are formed. Alternatively a relatively thin nozzle plate might be used on its own as a cover member.

In the example of FIG. 1 (and indeed throughout the present disclosure) each of the actuable piezoelectric walls 14 may comprise an upper half and a lower half, divided in a plane defined by the array direction (left to right in FIG. 1) and the channel extension direction (into the page in FIG. 1). The upper and lower halves of the piezoelectric walls may be poled in opposite directions perpendicular to the channel extension and array directions so that, when a potential difference is applied across the wall perpendicular to the array direction, the two halves deflect so as to bend towards one of the fluid chambers; the shape adopted by the deflected walls resembles a chevron and this may therefore be referred to as a "chevron mode" of actuation. Alternatively, each of the actuable piezoelectric walls may be poled in a unitary manner in a single direction (i.e. not as upper and lower halves poled in opposite directions) so that, when a potential difference is applied across the wall, the wall deflects in a "shear mode" of actuation. Other methods of providing electrodes and poling walls have also been proposed, which afford the ability to deflect the walls in a similar bending motion.

Background art of particular relevance is provided in WO 2010/055345 A1, which discloses a method (so-called "printing mode 1") for depositing droplets onto a substrate, the method employing an apparatus such as an inkjet printhead, the apparatus having: an array of channels, acting as fluid chambers, separated by interspersed walls, with each channel communicating with an aperture or nozzle for the release of droplets of a fluid contained within the channel, such as ink. Each of the walls separates two neighbouring channels and is actuable such that, in response to a first potential difference, it will deform so as to decrease the volume of one channel and increase the volume of the other channel, and, in response to a second potential difference, it will deform so as to cause the opposite effect on the volumes of the neighbouring channels. The method includes the steps of: receiving input data, such as an array of image data pixels; assigning, based on the input data, all the channels within the array as either firing channels or non-firing channels so as to produce groups of one or more contiguous firing channels separated by groups of one or more contiguous non-firing channels; actuating the walls of certain channels so that, for each non-firing chamber, either the walls move with the same sense or they remain stationary, and, for each firing chamber, either the walls move with opposing senses (see FIG. 3), or one wall is stationary while the other is moved (see FIG. 4). These actuations result in each of the firing channels releasing at least one droplet of fluid, the resulting droplets forming dots disposed on a straight line on said substrate, for example so as to form a representation of a line of image data pixels. The dots are separated on the line by gaps corresponding to the non-firing channels.

FIG. 2 illustrates a droplet deposition head comprising an array 10 of fluid chambers 12 separated by interspersed walls 14 formed of a piezoelectric material (e.g. PZT), each fluid chamber 12 communicating with an aperture (nozzle) 16 for the release of droplets of fluid, each of said walls 14 separating two neighbouring fluid chambers 12, and each fluid chamber 12 being defined by a first wall in a first direction relative to the fluid chamber, and a second wall in a second direction relative to the fluid chamber, the second direction being opposite to the first direction.

In this example, one side (the right side in the illustrated example) of each wall 14 has a "common" electrode 19 to which a common potential is applied, and the other side (the left side as illustrated) of each wall 14 has an "active" electrode 18. The electrodes are connected to drive circuitry (not shown). Wall motion is induced by applying, by means of a drive waveform comprising a sequence of drive pulses, a drive potential to the "active" electrode 18. If the drive potential is greater than, or 10 less than, the common potential, the wall moves towards the electrode that has the highest potential.

FIG. 3 shows in more detail how the walls in the printing mode 1 move. In this figure, and throughout the present disclosure, underlining of fluid chambers indicates that they are assigned (based on input data) as firing chambers in a given cycle, "−" in a chamber indicates the chamber is experiencing a decrease in pressure (due to an increase in volume of the chamber as a result of actuation of one or both of its walls), and "+" in a chamber indicates the chamber is experiencing an increase in pressure (due to a decrease in volume as a result of actuation of one or both of its walls).

In the printing mode 1 illustrated in FIG. 3, the walls of the firing chambers move in opposite senses, which means that the volume of the chambers is increased and decreased alternately to cause ejection, while the walls of the non-firing chambers move in the same sense, which means that there is no change in the volume/pressure inside the chamber, and thus no ejection of fluid.

At this point, it should be noted that, in order for the walls of the droplet deposition head to move in the bidirectional manner of printing mode 1, the common potential applied to the "common" electrodes is between a highest drive potential and a lowest drive potential. Due to the electrode configuration of this droplet deposition head and the application of a common potential to one of the electrodes on each wall, at least the walls of the non-firing chambers located between different bands of firing chambers will always move in the same sense.

In other words, if the drive potential applied to the "active" electrode is greater than the common potential, the wall moves towards the "active" electrode, but if the drive potential applied to the "active" electrode is less than common potential, the wall moves towards the "common" electrode. If the drive potential applied to the "active" electrode is substantially equal to the common potential applied to the "common" electrode, the wall remains stationary (i.e. remains in its neutral, unactuated, at-rest position).

In printing mode 1, the motion of the walls of the non-firing chambers prevents stagnation of the fluid, which over time could otherwise cause blockage of the nozzles of the chambers. However, moving the walls of non-firing chambers is energy-inefficient and can induce an undesirable level of heat into the droplet deposition head. Furthermore, it is difficult to eject a single drop, i.e. 1 dpd (dpd=drop per dot), because there is insufficient energy in the movement of the walls to eject such a drop.

There is therefore a desire to overcome the above limitations of printing mode 1 and achieve a more energy-efficient manner of printing, that is also able to eject single drops when required to do so.

Further background art of relevance is provided in WO 2010/055344 A1, WO 2017/118843 A1 and WO 2018/224821 A9.

SUMMARY OF THE INVENTION

Aspects of the present invention are set out in the appended independent claims, while particular embodiments of the invention are set out in the appended dependent claims.

According to a first aspect of the present invention there is provided a method for depositing droplets of fluid onto a medium utilising a droplet deposition head, the droplet deposition head comprising:

an array of fluid chambers separated by interspersed walls formed of a piezoelectric material, each fluid chamber communicating with an aperture for the release of droplets of fluid, each of said walls separating two neighbouring fluid chambers, and each fluid chamber being defined by a first wall in a first direction relative to the fluid chamber, and a second wall in a second direction relative to the fluid chamber, the second direction being opposite to the first direction;

wherein each of said walls has a first electrode on a first side of the wall and a second electrode on a second side of the wall, wherein the second electrode of each of the walls is connected to a common potential, and wherein the first electrode of each of the walls is selectively settable to one of (a) a drive potential that is different from the common potential, and (b) the common potential;

wherein each of said walls is actuable such that, in response to the application of the drive potential to the respective first electrode, the respective wall will move in the first direction from a neutral position into a deformed position, and in response to the application of the common potential to the respective first electrode, the respective wall will return to, or remains in, the neutral position;

the method comprising, for an actuation cycle, the steps of:

receiving input data;

assigning, based on said input data, all the fluid chambers within said array as either firing chambers or non-firing chambers so as to produce bands of one or more contiguous firing chambers separated by bands of one or more contiguous non-firing chambers; and applying the common potential to the second electrodes and, based on said input data, selectively applying either the drive potential or the common potential to the first electrodes to actuate the walls of said chambers such that:

for each non-firing chamber, if the non-firing chamber is adjacent to a band of firing chambers, one wall is actuated in the first direction while the other wall remains in the neutral position, if the non-firing chamber is a single non-firing chamber between bands of firing chambers, both walls are actuated concurrently in the first direction, and if the non-firing chamber is not adjacent to a band of firing chambers, both walls either remain in the neutral position, or are actuated concurrently in the first direction, or are actuated concurrently in the second direction; and for each firing chamber, each of the first and second walls are actuated consecutively in the first direction;

said actuations during the actuation cycle resulting in each said firing chamber of the band of one or more contiguous firing chambers releasing at least one droplet, the resulting droplets forming bodies of fluid disposed on a line on said medium, said bodies of fluid being separated on said line by respective gaps for each of said bands of non-firing chambers, the size of each such gap generally corresponding in size to the respective band of non-firing chambers.

By virtue of the walls of the firing chambers moving in the same direction but at different times within an actuation cycle, this provides a more energy-efficient manner of printing compared to the above-described printing mode 1, that is also able to eject single drops when required to do so.

According to a second aspect of the present invention there is provided a method for depositing droplets of fluid onto a medium utilising a droplet deposition head, the droplet deposition head comprising:

an array of fluid chambers separated by interspersed walls formed of a piezoelectric material, each fluid chamber communicating with an aperture for the release of droplets of fluid, each of said walls separating two neighbouring fluid chambers, and each fluid chamber being defined by a first wall in a first direction relative to the fluid chamber, and a second wall in a second direction relative to the fluid chamber, the second direction being opposite to the first direction;

wherein each of said walls has a first electrode on a first side of the wall and a second electrode on a second side of the wall, wherein the second electrode of each of the walls is connected to a common potential, and wherein the first electrode of each of the walls is selectively settable to one of (a) a drive potential that is different from the common potential, and (b) the common potential;

wherein each of said walls is actuable such that, in response to the application of the drive potential to the respective first electrode, the respective wall will move in the first direction from a neutral position into a deformed position, and in response to the application of the common potential to the respective first electrode, the respective wall will return to, or remains in, the neutral position;

the method comprising, for an actuation cycle, the steps of:

receiving input data;

assigning, based on said input data, all the fluid chambers within said array as either firing chambers or non-firing chambers so as to produce bands of one or more contiguous firing chambers separated by bands of one or more contiguous non-firing chambers; and applying the common potential to the second electrodes and, based on said input data, selectively applying either the drive potential or the common potential to the first electrodes to actuate the walls of said chambers such that:

for at least a first firing chamber, the first wall of the first firing chamber is repeatedly actuated in the first direction and then returned to the neutral position while the second wall of the first firing chamber is kept in the neutral position; and at a time in the actuation cycle at which the first firing chamber is to eject a droplet of the fluid therein, the second wall of the first firing chamber is selectively actuated in the first direction substantially concurrently with the returning of the first wall of the first firing chamber to the neutral position, thereby causing the first firing chamber to eject a droplet of the fluid therein, and then the second wall of the first firing chamber is returned to the neutral position;

said actuations during the actuation cycle resulting in each said firing chamber of the band of one or more contiguous firing chambers releasing at least one droplet, the resulting droplets forming bodies of fluid disposed on a line on said medium, said bodies of fluid being separated on said line by respective gaps for each of said bands of non-firing chambers, the size of each such gap generally corresponding in size to the respective band of non-firing chambers.

According to a third aspect of the present invention there is provided a method for depositing droplets of fluid onto a medium utilising a droplet deposition head, the droplet deposition head comprising:

an array of fluid chambers separated by interspersed walls formed of a piezoelectric material, each fluid chamber communicating with an aperture for the release of droplets of fluid, each of said walls separating two neighbouring fluid chambers, and each fluid chamber being defined by a first wall in a first direction relative to the fluid chamber, and a second wall in a second direction relative to the fluid chamber, the second direction being opposite to the first direction;

wherein each of said walls has a first electrode on a first side of the wall and a second electrode on a second side of the wall, wherein the second electrode of each of the walls is connected to a common potential, and wherein the first electrode of each of the walls is selectively settable to one of (a) a first drive potential, (b) a second drive potential, and (c) the common potential, the common potential being between the first drive potential and the second drive potential;

wherein each of said walls is actuable such that, in response to the application of the first drive potential to the respective first electrode, the respective wall will move in the first direction from a neutral position into a deformed position, in response to the application of the second drive potential to the respective first electrode, the respective wall will move in the second direction from the neutral position into a deformed position, and in response to the application of the common potential to the respective first electrode, the respective wall will return to, or will remain in, the neutral position;

the method comprising, for an actuation cycle, the steps of:

receiving input data;

assigning, based on said input data, all the fluid chambers within said array as either firing chambers or non-firing chambers so as to produce bands of one or more contiguous firing chambers separated by bands of one or more contiguous non-firing chambers; and applying the common potential to the second electrodes and, based on said input data, selectively applying either the first drive potential, the second drive potential or the common potential to the first electrodes to actuate the walls of said chambers such that:

for at least a first firing chamber, the first wall of the first firing chamber is repeatedly actuated in the first direction and then the second direction while the second wall of the first firing chamber is kept predominantly in the neutral position; and at a time in the actuation cycle at which the first firing chamber is to eject a droplet of the fluid therein, the second wall of the first firing chamber is selectively actuated in the first direction substantially concurrently with the actuating of the first wall of the firing chamber in the second direction, thereby causing the first firing chamber to eject a droplet of the fluid therein, and then the second wall of the first firing chamber is returned to the neutral position;

optionally wherein the second wall of the first firing chamber is actuated in the second direction concurrently with an actuation of the first wall of the first firing chamber in the first direction, immediately prior to the time in the actuation cycle at which the first firing chamber is to eject a droplet of the fluid therein;

said actuations during the actuation cycle resulting in each said firing chamber of the band of one or more contiguous firing chambers releasing at least one droplet, the resulting droplets forming bodies of fluid disposed on a line on said medium, said bodies of fluid being separated on said line by respective gaps for each of said bands of non-firing chambers, the size of each such gap generally corresponding in size to the respective band of non-firing chambers.

With the second and third aspects of the invention, preferably the repeated actuations take place at substantially the resonant frequency of the firing chambers, or at substantially a harmonic or subharmonic of the resonant frequency of the firing chambers.

Thus, advantageously, the printing modes of the second and third aspects of the invention enable the droplet deposition head to be actuated at high frequency, whilst also achieving a reduction in the number of accidental droplets and the amount of ink that weep out of the fluid chambers during use, which would otherwise lead to the creation and ejection of unexpected large droplets.

Also provided are a droplet deposition head, a droplet deposition apparatus, and a computer program for executing the methods of the first, second and third aspects of the invention.

BRIEF DESCRIPTION OF THE DRAWINGS

Embodiments of the invention will now be described, by way of example only, and with reference to the drawings in which.

In the figures, like elements are indicated by like reference numerals throughout.

DETAILED DESCRIPTION OF PREFERRED EMBODIMENTS

The present embodiments represent the best ways known to the Applicant of putting the invention into practice. However, they are not the only ways in which this can be achieved.

The present embodiments relate to what is referred to herein as "printing mode 2".

Droplet Deposition Head and Droplet Deposition Apparatus Overview

Figure 6:
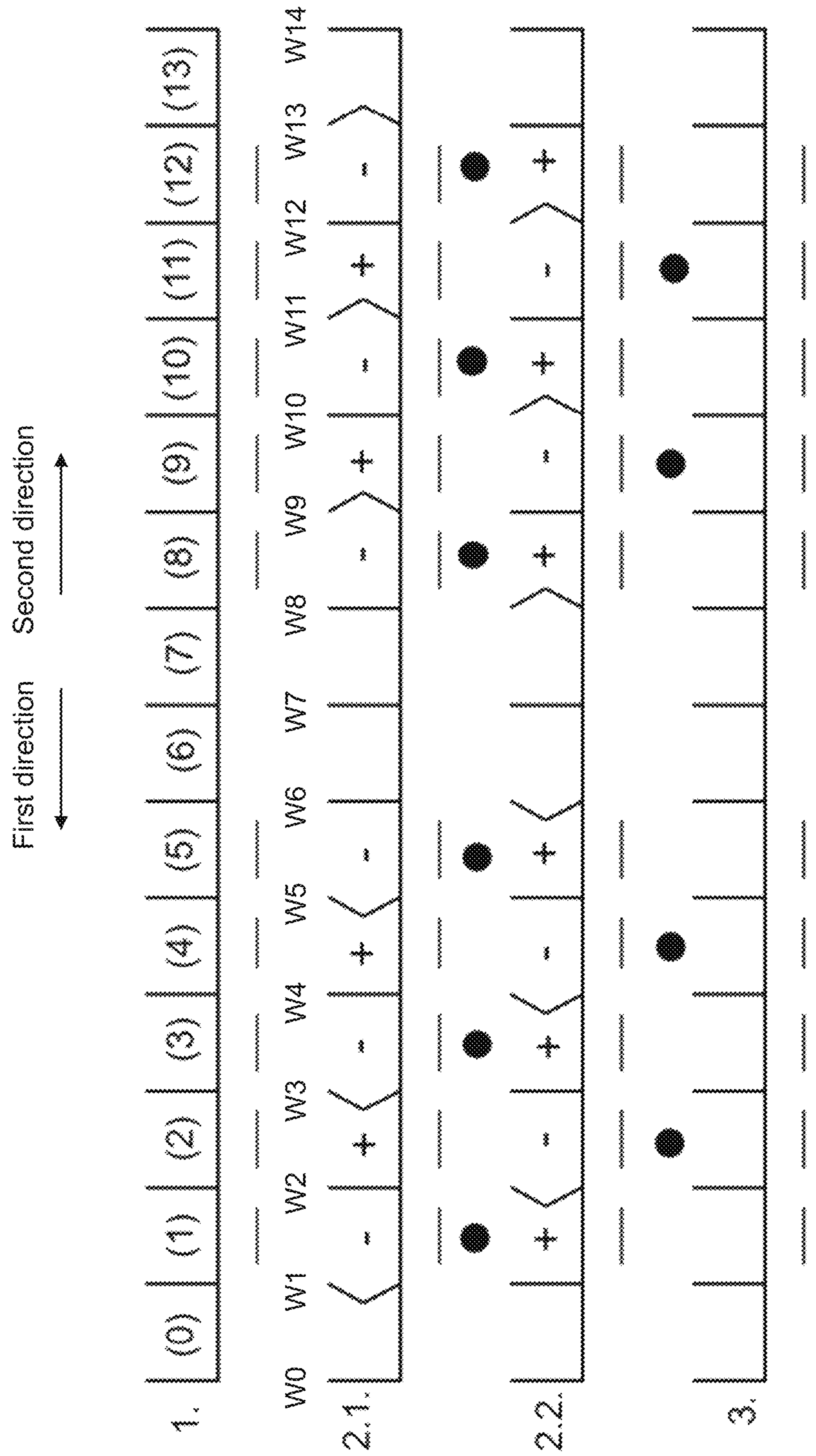
FIG. 6 illustrates first and second mirror-image arrays of fluid chambers, each configured to implement the printing mode 2 of FIG. 5.

With particular reference again to FIG. 2, a droplet deposition head as used in the printing mode 2 comprises an array 10 of fluid chambers 12 separated by interspersed walls 14 formed of a piezoelectric material, each fluid chamber 12 communicating with an aperture 16 for the release of droplets of fluid, each of said walls 14 separating two neighbouring fluid chambers 12. Each fluid chamber 12 is defined by a first wall in a first direction relative to the fluid chamber 12, and a second wall in a second direction relative to the fluid chamber 12, the second direction being opposite to the first direction. In the illustrated embodiment of FIG. 2, the first direction is to the left and the second direction is to the right, but this need not be the case. It should also be noted that said array 10 of fluid chambers 12 might not be the overall total number of fluid chambers present in the droplet deposition head; additional arrays of fluid chambers may also be present (e.g. as illustrated in FIG. 6), optionally separated by, or terminated by, one or more non-firing chambers.

Each of the walls 14 has a first ("active") electrode 18 on a first side of the wall and a second ("common") electrode 19 on a second side of the wall, connected to drive circuitry (not shown). In the illustrated embodiment, the first side is in the first direction relative to the wall, and the second side is in the second direction relative to the wall, but this need not be the case and in alternative embodiments the first and second electrodes could be the other way round.

The second electrode 19 of each of the walls is connected to a common potential (which may be ground potential, 0V, or another value, such as a positive potential greater than ground potential). The first electrode 18 of each of the walls is selectively settable, by means of a drive waveform, to one of (a) a drive potential that is different from the common potential, and (b) the common potential. In the illustrated embodiment the drive potential (e.g. +V) is higher than the common potential (e.g. 0V). However, as mentioned above, in alternative embodiments the drive potential may be less than the common potential.

In the illustrated embodiment, all the second electrodes 19 are subjected to the same common potential, simultaneously and constantly, to simplify the drive circuitry and control electronics. However, in alternative embodiments, all the second electrodes 19 need not be subjected to the same common potential; instead, different groups of one or more second electrodes 19 may be subjected to different common potentials. Thus, the common potential need not be the same for each wall 14. Moreover, different groups of one or more second electrodes 19 may receive the common potential at different times, rather than simultaneously and constantly.

Each of said walls 14 is actuable such that, in response to the application of the drive potential to the respective first electrode 18, the respective wall will move in the first direction from a neutral position into a deformed position, and in response to the application of the common potential to the respective first electrode 18, the respective wall will return to, or remains in, the neutral position.

In other words, by applying a drive potential signal to the first electrode 18 and a common potential signal to a second electrode 19, a potential difference is applied across the respective wall 14, the potential difference being the difference between the drive potential signal and the common potential signal. Such a potential difference causes deformation (actuation) of the wall. Where a wall is to remain undeformed, there must be no potential difference across the wall; this is achieved by applying the same signal (i.e. the common potential signal) to both the first and second electrodes.

Figure 1:
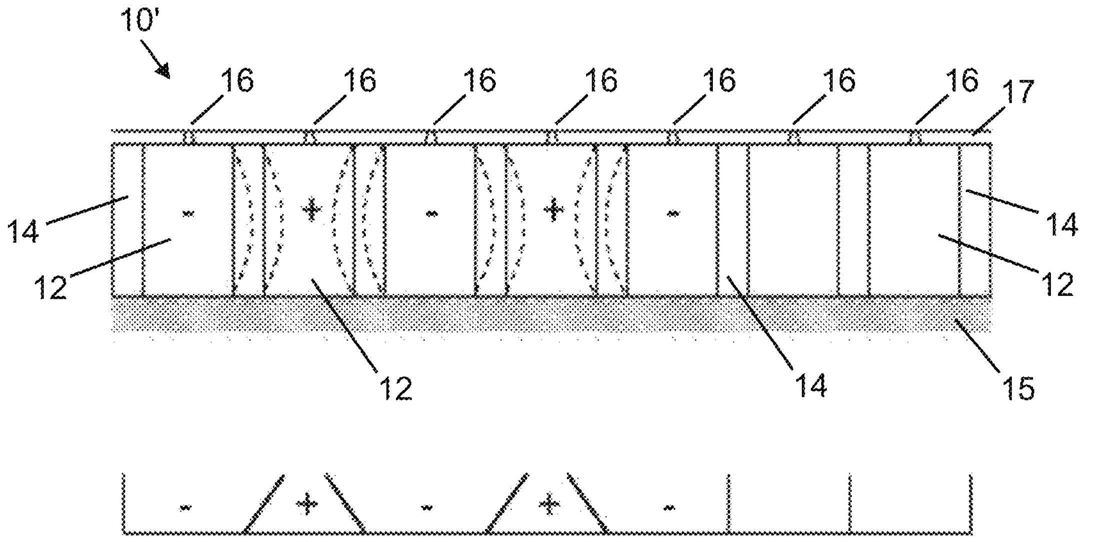
FIG. 1 illustrates an array of fluid chambers forming part of a droplet deposition head, with some walls of the chambers having been actuated, and beneath, a simplified representation of the same array with the same actuated walls.
Figure 2:
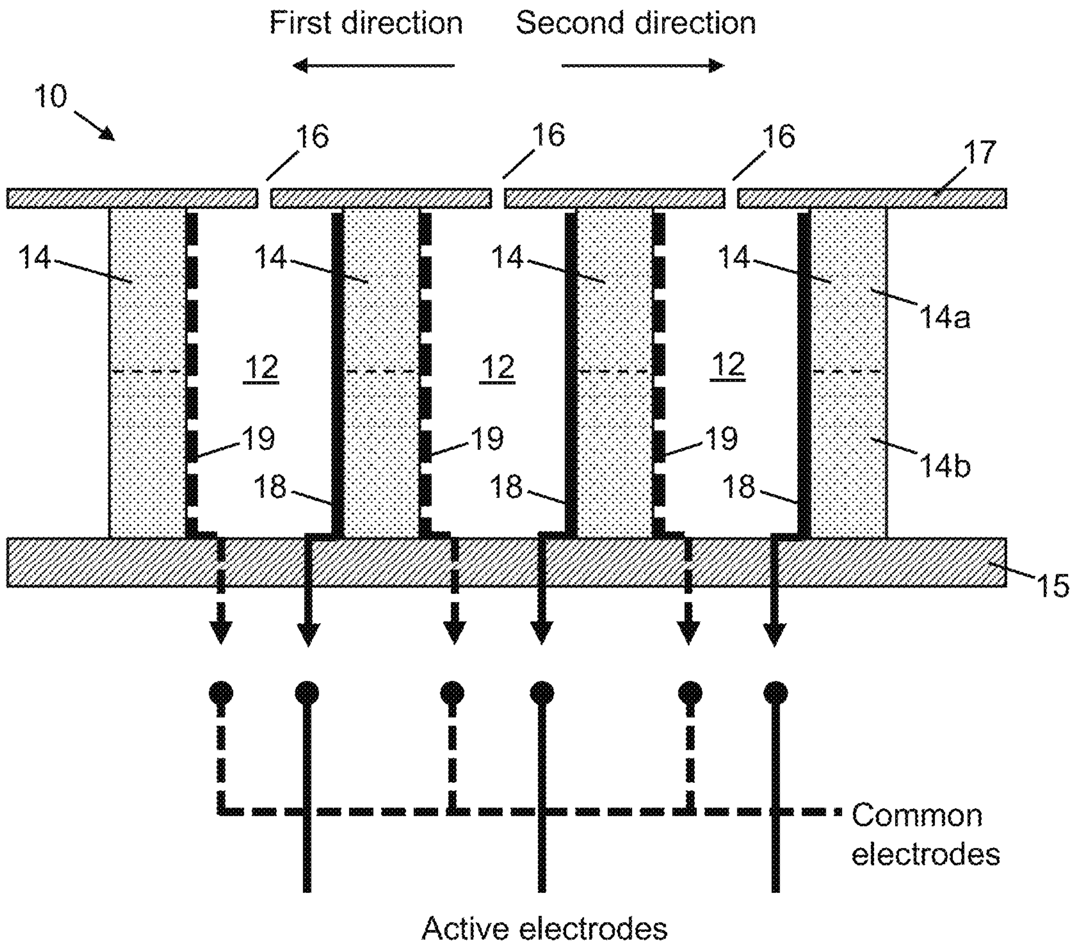
FIG. 2 illustrates an end view of an array of fluid chambers, showing common electrodes connected to a common potential, and also active electrodes.
Figure 3:
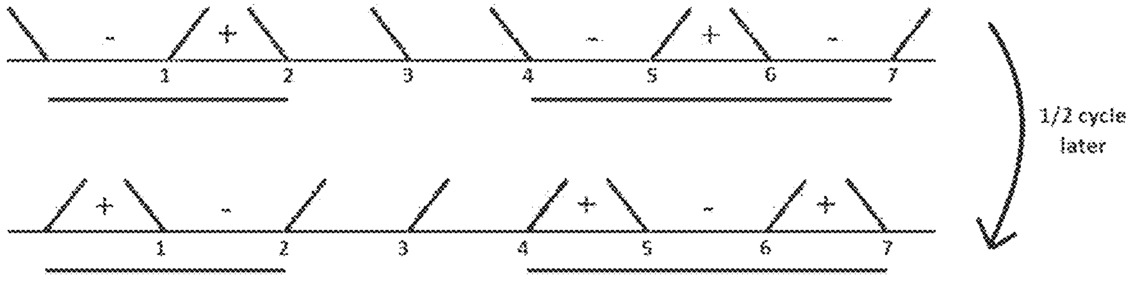
FIG. 3 is a simplified representation of the so-called "printing mode 1"
Figure 4:
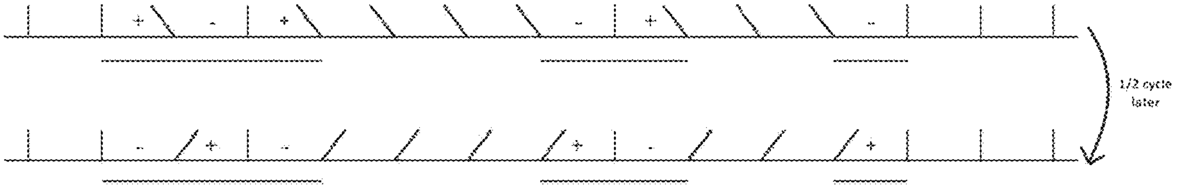
FIG. 4 is another simplified representation of the printing mode 1.

Apparatus such as that depicted in FIG. 2 is commonly referred to as a 'side-shooter' owing to the placement of the nozzle approximately in the side of the fluid chambers; the nozzle is commonly provided equidistant of each end. In such constructions, the ends of the channels will often be left open to allow all channels to communicate with one or more common fluid manifolds. This further allows a flow to be set up along the length of the channel during use of the apparatus so as prevent stagnation of the fluid and to sweep detritus within the fluid away from the nozzle. It is often found to be advantageous to make this flow along the length of the channel greater than the maximum flow through the nozzle due to fluid release. Put differently, when the apparatus is operated at maximum ejection frequency the average flow of fluid through each nozzle is less than the flow along each channel. Preferably this flow is at least three or, more preferably still, five times greater than the maximum flow through the nozzle due to fluid release.

In order to provide maximal density of deposited droplets, preferably every channel or chamber within the array is filled with an ejection fluid, such as an ink, during use and provided with an aperture or nozzle for ejection of the fluid.

Printing Mode 2

To address the increase in temperature and the high power consumption experienced with the printing mode 1, the present printing mode 2 is introduced whereby the walls of the firing chambers generally move in the same direction (in the same sense) but at different times within a single actuation cycle.

Figure 5:
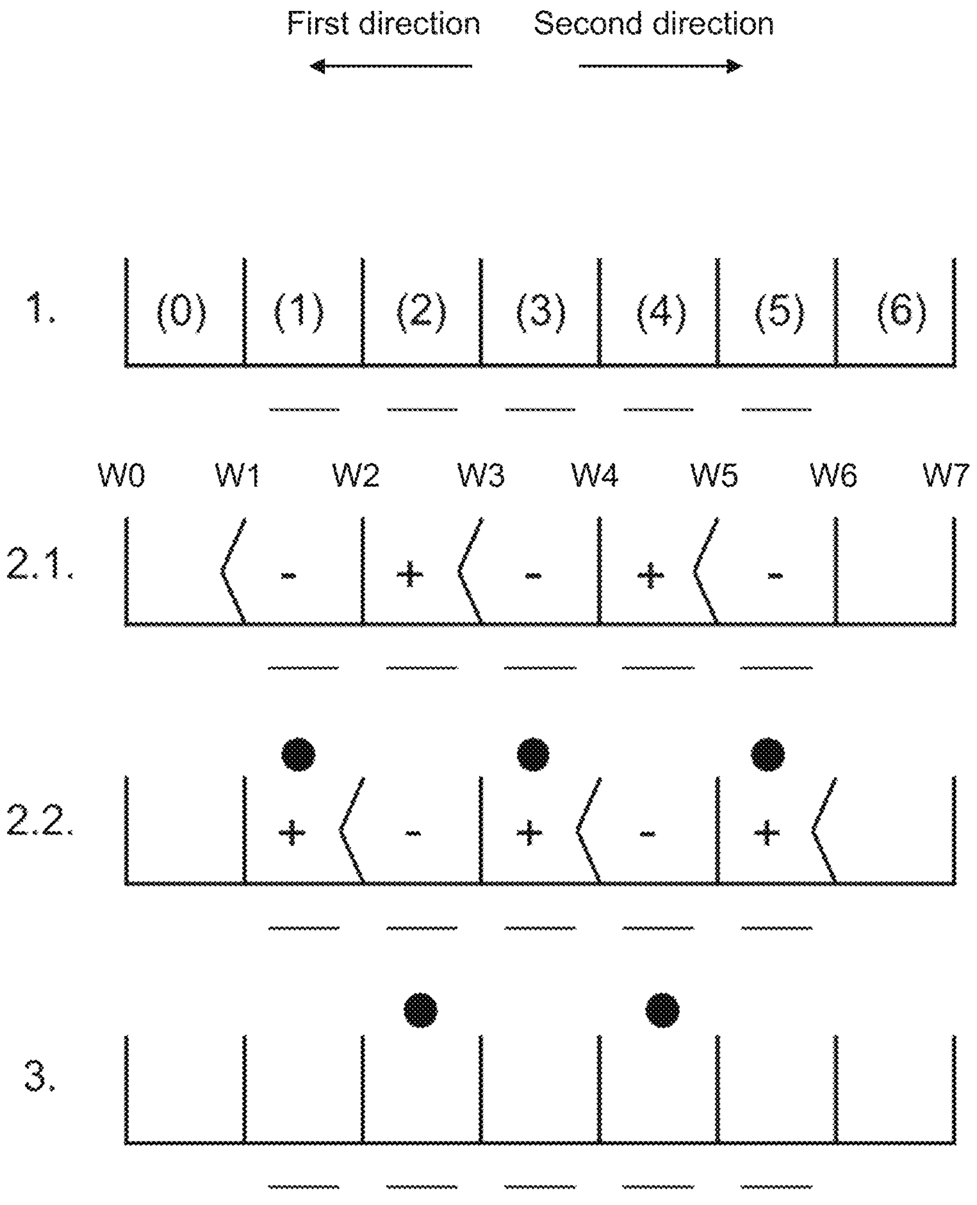
FIG. 5 is a simplified representation of a so-called "printing mode 2" across an array of fluid chambers, and respective steps to eject droplets.

FIG. 5, as described in greater detail below, provides a first example of the apparatus of FIG. 2 undergoing a series of actuations in accordance with the printing mode 2, and is useful for illustrating the general principles of the mode. The nomenclature and direction convention (i.e. the references to the first and second directions) as used above is maintained.

At different times within a single cycle, chambers 1-5 experience an increase in pressure (as indicated by a "+") owing to inward movement of one of their walls, leading to a decrease in the volume of those chambers. As may also be seen in the figure, this inward movement causes a pressure decrease (as indicated by "–") in the neighbouring chambers as the same wall movement acts to increase the volumes of those chambers. In the simplified representations used herein, the walls are represented by chevrons ("<" or ">") or vertical lines: the direction of deflection of a wall is represented by the direction in which the chevron points, whereas an undeformed wall is represented by a vertical line.

In more detail, FIG. 5 schematically illustrates an actuator comprising an array of seven fluid chambers separated by actuable walls, configured as illustrated in FIG. 2. A band of firing chambers 1 to 5 (denoted by underlining) is separated by non-firing chambers 0 and 6.

Thus, in this example, all the fluid chambers within the array of fluid chambers are assigned as either firing chambers (1 to 5) or non-firing chambers (0 and 6). As is characteristic of shared-wall devices, each fluid chamber shares its walls with the neighbouring chambers. This means that in a band of firing chambers not all fluid chambers fire exactly at the same time.

In previous applications (for example, WO 2010/055345 A1), it has been described that (substantially) half of the firing chambers fire in one half of a cycle while the other (substantially) half of the firing chambers fire in second half of a cycle. The ejection of the droplets of all firing chambers (first and second half cycles), however, occurs substantially at the same time, forming a single line of droplets separated by gaps corresponding to the non-firing chambers in the deposition media.

Figure 7:
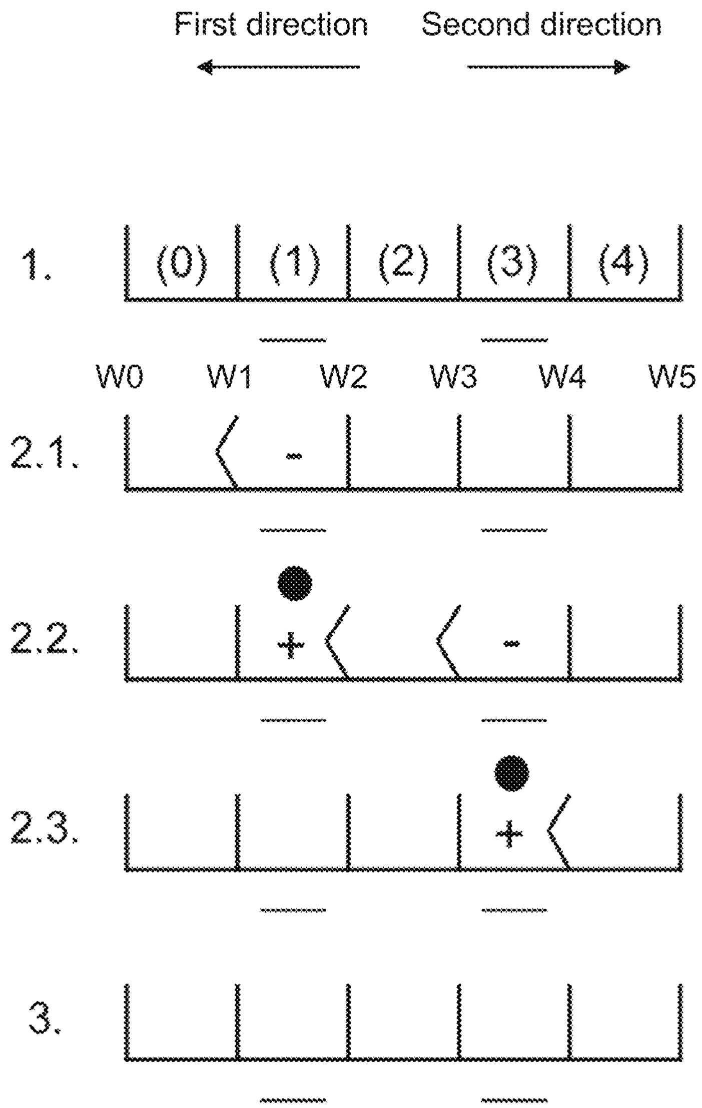
FIG. 7 is another representation of a printing mode 2, and respective steps to eject droplets.

In contrast, in the present printing mode 2, all wall movements responsible for firing a droplet are provided in at least two stages (for example, stages 2.1 and 2.2 of FIG. 5, or stages 2.1, 2.2 and 2.3 of FIG. 7). The ejection of the droplets in these stages happens within a single cycle.

In the illustrated printing mode 2, each of the walls 14 is actuable such that, in response to the application of the drive potential to the respective first electrode 18, the respective wall will move in the first direction from its neutral (at rest) position into its deformed (actuated) position, and in response to the application of the common potential to the respective first electrode 18, the respective wall will return to, or remains in, the neutral position.

The present actuation method includes, for a given (single) actuation cycle, the steps of:

- receiving input data;
- assigning, based on said input data, all the fluid chambers 12 within the array 10 as either firing chambers or non-firing chambers so as to produce bands of one or more contiguous firing chambers separated by bands of one or more contiguous non-firing chambers; and
- applying the common potential to the second electrodes 19 and, based on said input data, selectively applying either the drive potential or the common potential to the first electrodes 18 to actuate the walls 14 of the chambers 12.

More particularly, for each non-firing chamber,

- if the non-firing chamber is adjacent to a band of firing chambers, one wall is actuated in the first direction while the other wall remains in the neutral position (i.e. stationary),
- if the non-firing chamber is a single non-firing chamber between bands of firing chambers, both walls are actuated concurrently in the first direction (so as not to change the volume of that chamber), and
- if the non-firing chamber is not adjacent to a band of firing chambers, both walls either remain in the neutral position, or are actuated concurrently in the first direction (or, alternatively, may be actuated concurrently in the second direction, if the chambers are configured for actuation in the second direction).

Meanwhile, for each firing chamber,

- each of the first and second walls are actuated consecutively (but not necessarily a particular one before the other) in the first direction.

The actuations during the actuation cycle result in each firing chamber of the band of one or more contiguous firing chambers releasing at least one droplet, the resulting droplets forming bodies of fluid disposed on a line on the medium, said bodies of fluid being separated on said line by respective gaps for each of said bands of non-firing chambers, the size of each such gap generally corresponding in size to the respective band of non-firing chambers.

Example of FIG. 5

In the specific example of FIG. 5, the actuation of the walls 14 is performed in the following steps:

Step 1: Beginning of One Actuation Cycle and Assignment of All Fluid Chambers as Either Firing Chambers (1 to 5) or Non-Firing Chambers (0 and 6)

For the sake of simplicity, at the beginning of the actuation cycle, all the walls 14 within the array 10 of fluid chambers are in their neutral position (i.e. are stationary), by applying the common potential to the first electrodes 18, as well as to the second electrodes 19. This way the volume of each fluid chamber 12 is initially constant. However, this may not always be the case.

Based on the input data, all the fluid chambers 12 within the array 10 are assigned as either firing chambers or non-firing chambers for the actuation cycle, so as to produce bands of one or more contiguous firing chambers separated by bands of one or more contiguous non-firing chambers.

Steps 2.1 and 2.2: Actuating the Walls so as to Eject One or More Droplets For each fluid chamber that is assigned as non-firing chamber:

- If the non-firing chamber is adjacent to a band of firing chambers, one wall is actuated in the first direction while the other wall remains in the neutral position, i.e. is stationary (e.g. as shown by fluid chambers 0 and 6 of FIG. 5). (In passing, it may be noted that the movement of a single wall does generate a pressure wave but by itself it is not enough to cause ejection.)
- If the non-firing chamber is a single non-firing chamber between bands of firing chambers, both walls are actuated concurrently in the first direction, so as not to change the volume of that chamber (e.g. as shown by fluid chamber 2 of FIG. 7).
- If the non-firing chamber is not adjacent to a band of firing chambers, both walls either remain in the neutral position, or are actuated concurrently in the first direction (or, alternatively, may be actuated concurrently in the second direction, if the chambers are configured for actuation in the second direction).

Meanwhile, for each firing chamber, each of the first and second walls 18, 19 are actuated consecutively (but, as discussed in greater detail below, not necessarily a particular one before the other) in the first direction. For instance, as illustrated in FIG. 5, the walls may be actuated in two stages due to the shared wall architecture, as follows:

- In the first stage (2.1):
  - walls W1, W3 and W5 are concurrently actuated in the first direction, increasing the volume of and drawing fluid (e.g. ink) into the firing chambers 1, 3 and 5 (the first stage's so-called "draw" step); while
  - walls W2, W4 and W6 remain in their neutral position (i.e. stationary);
- after a short period of time between 2.1 and 2.2, walls W1, W3 and W5 are released and return to the neutral position, decreasing the volume of the firing chambers 1, 3 and 5 and increasing the pressure inside the firing chambers (the first stage's so-called "release" step); and.
- in the second stage (2.2):
  - walls W2, W4 and 6 are concurrently actuated in the same first direction, decreasing the volume of firing chambers 1, 3 and 5, reinforcing the actuation and forming a droplet at the nozzle for ejection (the first stage's so-called "reinforce" step), and simultaneously increasing the volume of and drawing fluid (e.g. ink) into firing chambers 2 and 4 (the second stage's "draw" step); while
  - walls W1, W3 and W5 remain in their neutral position (i.e. stationary).

Step 3: Ending the Actuation Cycle

After a short period of time walls W2, W4 and W6 are released and return to the neutral position, decreasing the volume of the firing chambers 2 and 4, increasing the pressure inside the firing chambers (the second stage's "release" step) and forming a droplet at the respective nozzles for ejection.

Droplets are ejected by the nozzles corresponding to the firing chambers because each firing chamber receives energy from both its walls during both stages 2.1 and 2.2 of the cycle, unlike non-firing chamber 6 which does not receive energy from wall 7 during the first stage and consequently does not fire.

That is to say, in stage 2.2, droplets are ejected from chambers 1, 3 and 5 due to the actuation of walls W2, W4 and W6 in the first direction, decreasing the volume of chambers 1, 3 and 5 and forcing the droplets out. This follows the actuation of walls W1, W3 and W5 in the first direction in stage 2.1, to increase the volume of chambers 1, 3 and 5 and draw fluid in. Accordingly, for these chambers 1, 3 and 5, each of the first and second walls have been actuated non-currently, the first wall before the second. Each of chambers 1, 3 and 5 has therefore received energy from both its walls during the cycle.

On the other hand, with regard to the ejection of droplets from chambers 2 and 4, this happens in stage 3 due to the movement of walls W2, W4 and W6 back to the neutral position, decreasing the volume of chambers 2 and 4 to their original size, and due to the fact that walls W3 and W5 moved earlier in the cycle, in stage 2.1. Accordingly, for these chambers 2 and 4, each of the first and second walls have been actuated non-currently, the second wall before the first. Each of chambers 2 and 4 has therefore received energy from both its walls during the cycle. Furthermore, the initial draw pulse of walls W3 and W5 (in step 2.1) may be viewed as a pre-push pulse for the ejection of chambers 2 and 4, to introduce energy to the chambers in question such that, when the other wall returns to the neutral position, it will be capable of the desired ejection.

Chambers 1, 3 and 5 represent a first group of firing chambers, with all the firing chambers in that first group being actuated to eject droplets concurrently. Similarly, chambers 2 and 4 represent a second group of firing chambers, with all the firing chambers in that second group being actuated to eject droplets concurrently. The second group of firing chambers are actuated to eject droplets after the first group, with both the first and second groups being actuated within a single actuation cycle. Thus, the firing chambers within each group are actuated to eject droplets concurrently, with the groups themselves being actuated consecutively, within an actuation cycle. Nevertheless, the droplets from the subsequent group land on the media at substantially the same time as the first group.

In summary, therefore, with regard to the steps of FIG. 5, for a first firing chamber (e.g. chamber 1) the present actuation method comprises, in the actuation cycle:

actuating the first wall (wall W1) of the first firing chamber (chamber 1) in the first direction while the second wall (wall W2) of the first firing chamber remains in the neutral position, thereby increasing the volume of the first firing chamber and causing it to draw in a quantity of fluid, and then returning the first wall (wall W1) of the first firing chamber to the neutral position; and then actuating the second wall (wall W2) of the first firing chamber (chamber 1) in the first direction while the first wall (wall W1) of the first firing chamber remains in the neutral position, thereby decreasing the volume of the first firing chamber and causing the first firing chamber to eject a droplet of the fluid therein, and then returning the second wall (wall W2) of the first firing chamber to the neutral position.

As shown in FIG. 5, a second firing chamber (chamber 2) may be adjacent to the first firing chamber (chamber 1), the second firing chamber being in the second direction relative to the first firing chamber such that the second wall (wall W2) of the first firing chamber is the first wall of the second firing chamber. In the actuation cycle, the said actuating of the second wall (wall W2) of the first firing chamber in the first direction is performed while the second wall (wall W3) of the second firing chamber remains in the neutral position, thereby increasing the volume of the second firing chamber and causing the second firing chamber to draw in a quantity of fluid concurrently with the ejection of the droplet from the first firing chamber.

As explained above, the said returning of the second wall (wall W2) of the first firing chamber to the neutral position in the actuation cycle causes the ejection of a droplet of the fluid from within the second firing chamber, due to the energy already present in the second firing chamber (as a result of the second wall (wall W3) of the second firing chamber having already moved, earlier in the actuation cycle).

However, if necessary, the method may further comprise, in the actuation cycle, a supplementary step of actuating the second wall (wall W3) of the second firing chamber in the first direction while the first wall (wall W2) of the second firing chamber remains in the neutral position, thereby decreasing the volume of the second firing chamber to cause the second firing chamber to eject a droplet of the fluid therein, and then returning the second wall (wall W3) of the second firing chamber to the neutral position. Also, the potential difference applied across the second wall in the supplementary step may be altered to "fine tune" properties (such as the volume and/or velocity) of the ejected droplets released by the second firing chamber.

As noted above, the array of fluid chambers illustrated in FIG. 5 need not be the overall total number of fluid chambers present in the droplet deposition head. Rather, as illustrated in for example in FIG. 6, additional arrays of fluid chambers may also be present, wherein a first array comprises fluid chambers 0 to 6, and a second array comprises fluid chambers 7 to 13. Chambers 1 to 5 form a first band of firing chambers, and chambers 8 to 12 form a second band of firing chambers. As illustrated, the firing chambers of the first and second arrays of fluid chambers may be separated by one or more non-firing chambers (in the illustrated example, chambers 6 and 7), to advantageously isolate the actuations of the first array from those of the second array.

As illustrated, to cause the first and second arrays to operate in a balanced manner, the second array of fluid chambers (chambers 7 to 13) may be arranged as substantially a mirror image of the first array of fluid chambers (chambers 1 to 12). Moreover, as also illustrated, the movement of the walls of the second array of fluid chambers may substantially mirror the movement of the walls of the first array of fluid chambers, again to cause the first and second arrays to operate in a balanced manner in which any vibrations in one array essentially cancel-out corresponding vibrations in the other array, leading to more accurate printing.

From the example of FIG. 6, it will be appreciated that both walls of each firing chamber within the first band of firing chambers (chambers 1 to 5) move in succession in the first direction, and both walls of each firing chamber within the second band of firing chambers (chambers 8 to 12) move in succession in the second direction. The movement of the walls of the firing chambers in the second band of firing chambers (chambers 8 to 12) mirrors the movement of the walls of the firing chambers in the first band of firing chambers (chambers 1 to 5), and, in this example, the two bands of firing chambers are separated by a band of non-firing chambers comprising two fluid chambers (chambers 6 and 7).

It should be noted, though, that not all these features are required. For example, the first and second bands of firing chambers may be separated by any number of non-firing chambers, and the movement of the walls of the firing chambers in the second band of firing chambers does not have to mirror the movement of the walls of the firing chambers in the first band of firing chambers. The actuation cycle may start with the first wall of each firing chamber within the first and second bands of firing chambers, or the second wall of each firing chamber within the first and second bands of firing chambers, or any combination thereof. (In other words, in the second band of firing chambers, the walls W8, W10 and W12 may be actuated in the first stage, instead of walls W9, W11 and W13.)

Example of FIG. 7

Figure 8:
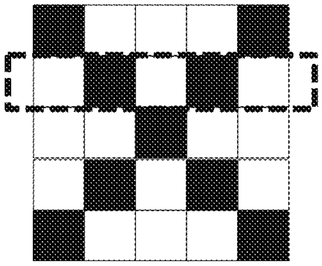
FIG. 8 illustrates a pattern of pixels to be printed, employing the printing mode of FIG. 7.

FIG. 7 provides a second example of the apparatus of FIG. 2 undergoing a series of actuations in accordance with the printing mode 2. FIG. 8 illustrates a pattern of pixels to be printed. The present example will focus in particular on the highlighted line of pixels, in which the first, third and fifth pixels are white pixels, and the second and fourth pixels are black pixels. This means that, to print this particular line, fluid chambers 0, 2 and 4 are assigned as non-firing chambers, and fluid chambers 1 and 3 are assigned as firing chambers.

As discussed above, the walls of each non-firing chamber are actuated such that:

- If the non-firing chamber is adjacent to a band of firing chambers, one wall is actuated in the first direction, while the other wall remains in the neutral position, i.e. is stationary (e.g. as shown by fluid chambers 0 and 6 of FIG. 7).
- If the non-firing chamber is a single non-firing chamber between bands of firing chambers, both walls are actuated concurrently in the first direction, so as not to change the volume of that chamber (e.g. as shown by fluid chamber 2 of FIG. 7).
- If the non-firing chamber is not adjacent to a band of firing chambers, both walls either remain in the neutral position, or are actuated concurrently in the first direction (or, alternatively, may be actuated concurrently in the second direction, if the chambers are configured for actuation in the second direction).

Meanwhile, for each firing chamber, each of the first and second walls are actuated consecutively (but not necessarily a particular one before the other) in the first direction. For instance, as illustrated in FIG. 7, the walls may by actuated as follows:

- In the first stage (2.1):
  - the wall W1 is actuated in the first direction, increasing the volume of and drawing fluid (e.g. ink) into the firing chamber 1 (the first stage's "draw" step); while
  - walls W2, W3, and W4 remain in their neutral position (i.e. stationary);
- after a short period of time between 2.1 and 2.2, wall W1 is released and returns to the neutral position, decreasing the volume of the firing chamber 1 and increasing the pressure inside the firing chamber 1 (the first stage's "release" step);
- in the second stage (2.2):
  - walls W2 and W3 are concurrently actuated in the same first direction, decreasing the volume of firing chamber 1, reinforcing the actuation and forming a droplet at the nozzle for ejection (the first stage's "reinforce" step), while keeping the volume of non-firing chamber 2 constant by moving both walls W2 and W3 in the first direction, and simultaneously increasing the volume of and drawing fluid (e.g. ink) into firing chamber 3 (the second stage's "draw" step); while
  - walls W1 and W4 remain in their neutral position (i.e. stationary);
- after a short period of time between 2.2 and 2.3, walls W2 and W3 are released and return to the neutral position, keeping the volume of the non-firing chamber 2 constant, and decreasing the volume of the firing chamber 3 and increasing the pressure inside the firing chamber 3 (the second stage's "release" step); and
- in the third stage (2.3):
  - wall W4 is actuated in the same first direction, decreasing the volume of firing chamber 3, reinforcing the actuation and forming a droplet at the nozzle for ejection (the second stage's "reinforce" step), and.
- after a short period of time wall W3 is released and returns to its neutral position.

More generally, with regard to the steps of FIG. 7, the present actuation method enables a first band of firing chambers (chamber 1; the first band may comprise one or more chambers) and a second band of firing chambers (chamber 3; again the second band may comprise one or more chambers) to be separated by a single non-firing chamber (chamber 2), the non-firing chamber being in the second direction relative to the first band of firing chambers (chamber 1), and the second band of firing chambers (chamber 3) being in the second direction relative to the non-firing chamber (chamber 2), such that,

- of the first band of firing chambers, the second wall (wall W2) of a first firing chamber (chamber 1) that is adjacent the non-firing chamber (chamber 2) is the first wall of the non-firing chamber (chamber 2), and
- of the second band of firing chambers, the first wall (wall W3) of a second firing chamber (chamber 3) that is adjacent the non-firing chamber (chamber 2) is the second wall of the non-firing chamber (chamber 2).

The method comprises, in an actuation cycle:

- actuating the first wall (wall W1) of the first firing chamber (chamber 1) in the first direction while the second wall (wall W2) of the first firing chamber remains in the neutral position, and then returning the first wall (wall W1) of the first firing chamber to the neutral position; and then
- actuating the second wall (wall W2) of the first firing chamber (chamber 1) and the first wall (wall W3) of the second firing chamber (chamber 3) concurrently in the first direction, thereby maintaining a constant volume of the non-firing chamber (chamber 2), while the second wall (wall W4) of the second firing chamber (chamber 3) remains in the neutral position, thereby causing the first firing chamber (chamber 1) to eject a droplet of the fluid therein, and then returning the second wall (wall W2) of the first firing chamber (chamber 1) and the first wall (wall W3) of the second firing chamber (chamber 3) to the neutral position; and then actuating the second wall (wall W4) of the second firing chamber (chamber 3) in the first direction while the first wall (wall W3) of the second firing chamber (chamber 3) remains in the neutral position, thereby causing the second firing chamber (chamber 3) to eject a droplet of the fluid therein, and then returning the second wall (wall W4) of the second firing chamber (chamber 3) to the neutral position.

Harmonic Actuation Modes

It is observed that, at higher print frequencies, printing modes 1 and 2 are most stable at (or in a small band around) a subharmonic of the acoustic resonance frequency. In traditional multiple cycle printing modes, a "cancellation pulse" is used to effectively cancel out the pressure wave remaining in the channel after actuation and essentially return the pressure in the channel to the initial condition from before the actuation. Single cycle firing schemes do typically not allow for an (effective) cancellation pulse. However, in the "harmonic actuation modes" that will now be described, the present inventors have found that deliberately actuating at or close to the fundamental acoustic resonance frequency (also referred to herein as the "harmonic frequency"), or a subharmonic thereof (i.e. 1/N of the acoustic resonance frequency, where N is an integer), can turn this into an advantage.

To this end, variants of the above-described printing mode 2 will now be described, with reference to FIGS. 9 to 19, in which certain walls (typically, but not necessarily, every other wall) within a band of one or more firing chambers are repeatedly and simultaneously actuated, in an oscillatory manner, between the neutral position and the first direction (as in FIGS. 9 and 10), or between the first direction and the second direction (as in FIG. 11). At the specific times in the actuation cycle at which a said firing chamber is to eject a droplet, the other wall of that firing chamber is selectively actuated in an inward direction within the firing chamber, substantially concurrently with an instance of opposing inward motion of the repeatedly-actuated wall. The expression "substantially concurrently" should be understood as meaning "at the same time as, or slightly before, or slightly after" the instance of opposing inward motion of the repeatedly-actuated wall—in any event, such as to put the fluid within the chamber under increased pressure sufficient to cause a droplet to be ejected. For example, the repeatedly-actuated wall may be moving inwardly from the first direction to the neutral direction (as in FIG. 10), or from the first direction to the second direction (as in FIG. 11), substantially at the time when the other wall of the chamber is selectively actuated in the first direction from its neutral position. To optimise the efficiency of the actuation process, preferably the repeatedly-actuated wall is actuated at substantially the fundamental resonant frequency (also referred to herein as the "harmonic frequency") of the firing chambers, or at substantially a harmonic or subharmonic of the resonant frequency of the firing chambers.

Figure 9:
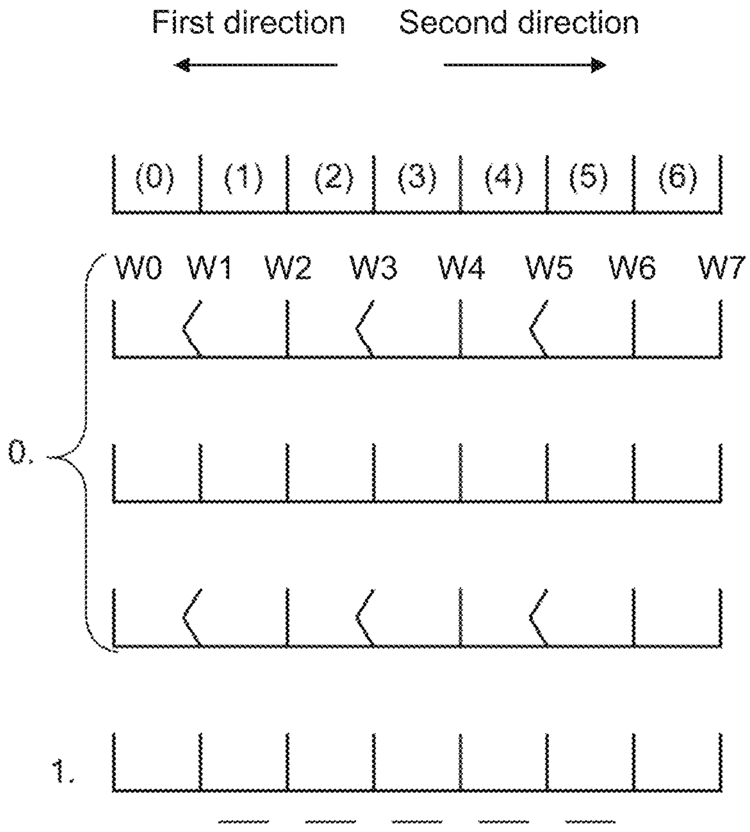
FIG. 9 illustrates an array of fluid chambers in which certain chamber walls are repeatedly actuated in accordance with a first "harmonic" mode of actuation.
Figure 10:
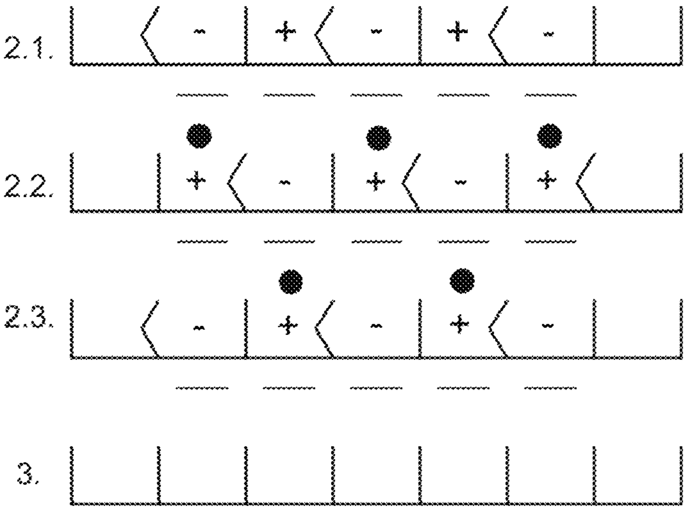
FIG. 10 illustrates the array of fluid chambers of FIG. 9 in which additional walls are selectively actuated to cause ejection of droplets.

Example of FIGS. 9 and 10 (First Example of a Harmonic Actuation Mode)

FIGS. 9 and 10 show a first example of a harmonic actuation mode. FIG. 10 is essentially a continuation of FIG. 9, with FIG. 9 showing the establishment of repeated actuation of certain walls (walls W1, W3 and W5) between the first direction and the neutral position, preferably at the chambers' harmonic frequency. FIG. 10 then illustrates the way in which certain fluid chambers (chambers 1 to 5), that have been assigned as firing chambers, are able to draw in fluid and then eject droplets of fluid upon the specifically-timed actuation of the opposing wall in the first (inward) direction, coinciding with opposing inward motion of the repeatedly-actuated walls.

Thus, in step 0 of FIG. 9, interleaving walls W1, W3 and W5 are actuated in the first direction and return to the neutral position at (or substantially at) the chambers' harmonic frequency. This movement is repeated in an oscillatory manner and provides energy to the system without ejecting a droplet, as the energy which is imparted to the meniscus of the fluid in the walls' neighbouring chambers is insufficient to overcome surface tension effects and losses induced by the nozzle. Walls W2, W4 and W6 remain in the neutral position (i.e. stationary). Following the nomenclature and direction convention used above, the repeatedly-actuated walls W1, W3 and W5 may be considered to be first walls, in the first direction relative to chambers 1, 3 and 5, whereas walls W2, W4 and W6 may be considered to be second walls, in the second direction relative to chambers 1, 3 and 5.

As indicated by the underlining in FIG. 9 (which is maintained in FIG. 10), in step 1 of the actuation method all the fluid chambers are assigned, based on input data, as either firing chambers (chambers 1 to 5) or non-firing chambers (chambers 0 and 6). The above-described repeated actuation of the first walls may be carried out before the chambers are assigned, but in any event is continued after the chambers are assigned.

Then, with reference to FIG. 10, the walls of each non-firing chamber (chambers 0 and 6) are actuated such that:

- if the non-firing chamber is a single non-firing chamber between bands of firing chambers, both walls are actuated concurrently in the first direction, so as not to change the volume of that chamber; otherwise.
- one wall is actuated in the first direction while the other wall remains in the neutral position, or both walls remain in the neutral position.

The walls of each firing chamber (chambers 1 to 5) are actuated such that:

- in the first stage (2.1):
  - walls W1, W3 and W5 keep moving in the first direction (substantially) at the chambers' harmonic frequency; while
  - walls W2, W4, and W6 remain in the neutral position (i.e. stationary);
- after a short period of time between stages 2.1 and 2.2, walls W1, W3 and W5 are released and return to the neutral position (substantially) at the chambers' harmonic frequency, decreasing the volume of the firing chambers 1, 3 and 5 and increasing the pressure inside the firing chambers 1, 3 and 5;
- in the second stage (2.2):
  - walls W2, W4 and W6 are actuated in the same first direction due to the effect of an ejection pulse in the drive waveform, substantially concurrently with the returning of walls W1, W3 and W5 to the neutral position, such that the energy necessary to eject all the droplets from all the firing chambers is added to the actuation cycle, decreasing the volume of firing chambers 1, 3, and 5, and forming a droplet for ejection at each of the corresponding nozzles; and simultaneously
  - increasing the volume of and drawing ink into firing chambers 2 and 4; while
  - walls W1, W3 and W5 remain in the neutral position (i.e. stationary);

after a short period of time between 2.2 and 2.3, walls W2, W4 and W6 are released and return to the neutral position;

in the third stage (2.3):

walls W1, W3 and W5 keep moving in the first direction (substantially) at the chambers' harmonic frequency, decreasing the volume of firing chambers 2 and 4, and forming a droplet for ejection at each of the corresponding nozzles; while walls W2, W4, and W6 remain in the neutral position (i.e. stationary);.

after a short period of time between 2.3 and 3, the walls W1, W3 and W5 are released and return to the neutral position (substantially) at the chambers' harmonic frequency;

after firing, walls W1, W3 and W5 are actuated again in the first direction and then return to the neutral position (substantially) at the chambers' harmonic frequency, as shown in step 0.

More generally, with regard to the steps of FIGS. 9 and 10, the method comprises, for a given (single) actuation cycle, the steps of:

receiving input data;

assigning, based on said input data, all the fluid chambers within said array as either firing chambers or non-firing chambers so as to produce bands of one or more contiguous firing chambers separated by bands of one or more contiguous non-firing chambers; and applying the common potential to the second electrodes and, based on said input data, selectively applying either the drive potential or the common potential to the first electrodes to actuate the walls of said chambers such that:

for at least a first firing chamber (e.g. chambers 1, 3 and 5), the first wall (walls W1, W3 and W5) of the or each first firing chamber is repeatedly actuated in the first direction and then returned to the neutral position while the second wall (walls W2, W4 and W6) of the or each first firing chamber is kept in the neutral position; and at a time in the actuation cycle at which one or more first firing chamber is to eject a droplet of the fluid therein, the second wall (walls W2, W4 and W6) of the respective first firing chamber(s) is selectively actuated in the first direction substantially concurrently with the returning of the first wall of the first firing chamber to the neutral position (i.e. before the first wall of the respective first firing chamber is again actuated in the first direction), thereby causing the respective first firing chamber to eject a droplet of the fluid therein, and then the second wall (walls W2, W4 and W6) of the respective first firing chamber is returned to the neutral position. The aforementioned "time in the actuation cycle" at which the selective actuation of the second wall(s) takes place may be immediately following the assignment of the firing chambers, before the completion of the first repeated actuation of the first wall, although preferably the first wall is repeatedly actuated at least once before the selective actuation of the second wall(s) takes place.

The actuations during the actuation cycle result in each said firing chamber of the band of one or more contiguous firing chambers releasing at least one droplet, the resulting droplets forming bodies of fluid disposed on a line on said medium, said bodies of fluid being separated on said line by respective gaps for each of said bands of non-firing chambers, the size of each such gap generally corresponding in size to the respective band of non-firing chambers.

As illustrated in FIG. 10, the or each first firing chamber may be a member of a first group of one or more firing chambers (chambers 1, 3 and 5) that are interleaved by respective firing chambers of a second group of one or more firing chambers (chambers 2 and 4), wherein the first wall (walls W1, W3 and W5) of each of the members of the first group of firing chambers are simultaneously repeatedly actuated in the first direction and then returned to the neutral position.

Thus, a second firing chamber (e.g. chamber 2) that is a member of the second group of firing chambers may be adjacent a respective first firing chamber (e.g. chamber 1), the second firing chamber being in the second direction relative to the first firing chamber such that the second wall (e.g. wall W2) of the first firing chamber is the first wall of the second firing chamber.

The method may further comprise, in the actuation cycle:

keeping the second wall (wall W3) of the second firing chamber (chamber 2) in the neutral position while the second wall (wall W2) of the first firing chamber (chamber 1) is actuated to eject said droplet of the fluid therein; and then actuating the second wall (wall W3) of the second firing chamber (chamber 2) in the first direction substantially concurrently with the first wall (wall W2) of the second firing chamber being in the neutral position, thereby causing the second firing chamber (chamber 2) to eject a droplet of the fluid therein, and then returning the second wall (wall W3) of the second firing chamber (chamber 2) to the neutral position.

It will be appreciated that the second wall (wall W3) of the second firing chamber (chamber 2) is itself repeatedly actuated in the first direction and returned to the neutral position in synchronicity with the repeated actuation of the first wall (wall W1) of the first firing chamber (chamber 1)—not least since the second wall (wall W3) of the second firing chamber may be the first wall of a subsequent firing chamber of the first group, e.g. chamber 3 as illustrated, and all the first walls of the firing chambers of the first group are repeatedly actuated in synchronicity with one another.

Chambers 1, 3 and 5 represent a first group of firing chambers, with all the firing chambers in that first group being actuated to eject droplets concurrently. Similarly, chambers 2 and 4 represent a second group of firing chambers, with all the firing chambers in that second group being actuated to eject droplets concurrently. The second group of firing chambers are actuated to eject droplets after the first group, with both the first and second groups being actuated within a single actuation cycle. Thus, the firing chambers within each group are actuated to eject droplets concurrently, with the groups themselves being actuated consecutively, within an actuation cycle.

Figure 11:
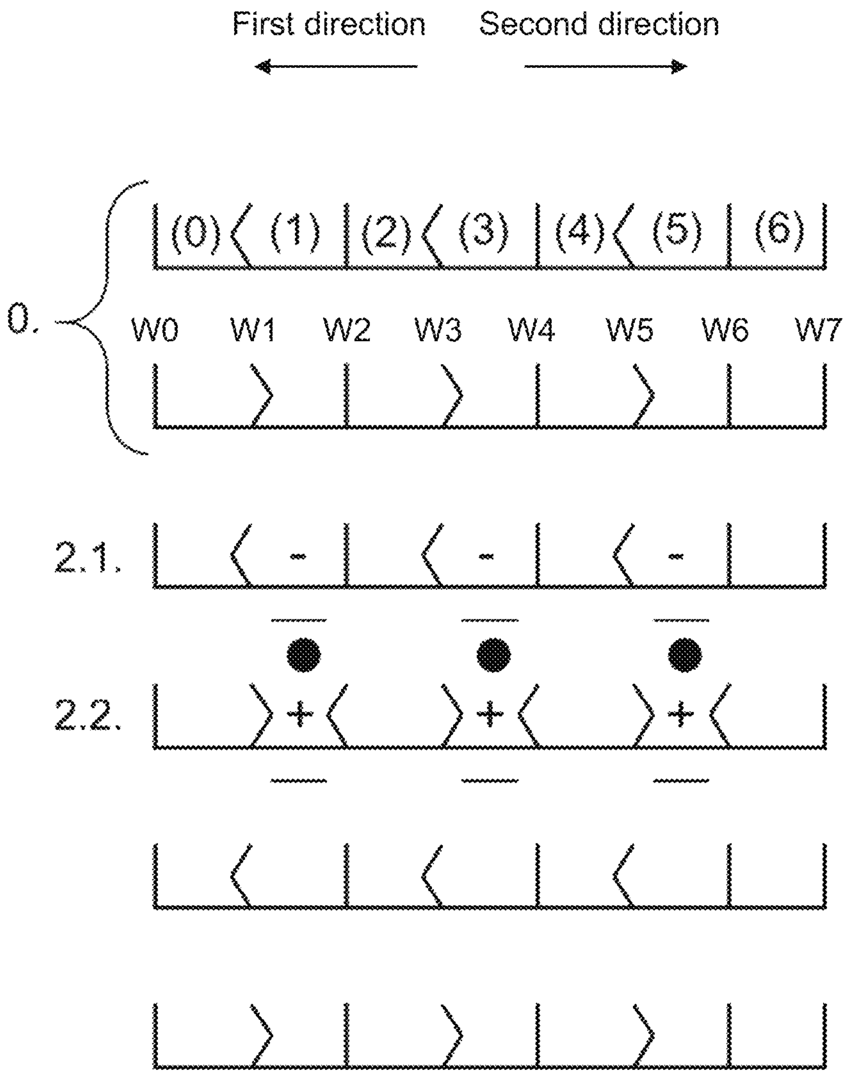
FIG. 11 illustrates an array of fluid chambers in which certain chamber walls are repeatedly actuated in accordance with a second "harmonic" mode of actuation, and other walls being selectively actuated to cause ejection of droplets.

Example of FIG. 11 (Second Example of a Harmonic Actuation Mode)

FIG. 11 shows a second example of a harmonic actuation mode, similar to that of FIG. 10. However, whereas in FIG. 10 the walls are actuable between the neutral position and the first direction, in the case of FIG. 11 the walls are actuable between the first direction and the second direction. This is achieved by the second electrode of each of the walls being connected to a common potential (e.g. +V), and the first electrode of each of the walls being selectively settable to one of (a) a first drive potential (e.g. 0V), (b) a second drive potential (e.g. ++V), and (c) the common potential (e.g. +V), the common potential being between the first drive potential and the second drive potential. Each of said walls is actuable such that, in response to the application of the first drive potential to the respective first electrode, the respective wall will move in the first direction from the neutral position into a deformed position, in response to the application of the second drive potential to the respective first electrode, the respective wall will move in the second direction from the neutral position into a deformed position, and in response to the application of the common potential to the respective first electrode, the respective wall will return to, or will remain in, the neutral position.

Thus, in step 0 of FIG. 11, interleaving walls W1, W3 and W5 are actuated in the first direction and then the second direction at (or substantially at) the chambers' harmonic frequency, without stopping at the neutral position. This movement is repeated in an oscillatory manner and provides energy to the system without ejecting a droplet, as the energy which is imparted to the meniscus of the fluid in the walls' neighbouring chambers is insufficient to overcome surface tension effects and losses induced by the nozzle. Walls W2, W4 and W6 remain in the neutral position (i.e. stationary). Following the nomenclature and direction convention used above, the repeatedly-actuated walls W1, W3 and W5 may be considered to be first walls, in the first direction relative to chambers 1, 3 and 5, whereas walls W2, W4 and W6 may be considered to be second walls, in the second direction relative to chambers 1, 3 and 5.

As indicated by the underlining in FIG. 11, the fluid chambers are assigned, based on input data, as either firing chambers (in this case, chambers 1, 3 and 5) or non-firing chambers (chambers 0, 2, 4 and 6). The above-described repeated actuation of the first walls may be carried out before the chambers are assigned, but in any event is continued after the chambers are assigned.

The walls of each firing chamber (chambers 1 to 5) are actuated such that:

- in the first stage (2.1):
  - walls W1, W3 and W5 are actuated in the first direction (substantially) at the chambers' harmonic frequency; while
  - walls W2, W4 and W6 remain in the neutral position (i.e. stationary);
- in the second stage (2.2):
  - walls W1, W3 and W5 are actuated in the second direction (substantially) at the chambers' harmonic frequency; while
  - walls W2, W4 and W6 are actuated in the first direction due to the effect of an ejection pulse in the drive waveform, substantially concurrently with the actuation of walls W1, W3 and W5 in the second direction, such that the energy necessary to eject all the droplets from all the firing chambers is added to the actuation cycle, decreasing the volume of firing chambers 1, 3 and 5, and forming a droplet for ejection at each of the corresponding nozzles; and.
- after firing, walls W1, W3 and W5 are actuated again in the first direction and then the second direction (substantially) at the chambers' harmonic frequency, as shown in step 0.

As for each of the non-firing chambers, if the band of non-firing chambers is not a single non-firing chamber in between bands of firing chambers, the walls are actuated in the actuation cycle such that:

- one wall is actuated either in the first direction only (e.g. wall W6) or in both the first and second directions (e.g. wall W1), while the other wall remains in the neutral position (e.g. walls W0 and W7); or both walls remain in the neutral position.

On the other hand, if a single non-firing chamber is between bands of firing chambers, the walls are actuated in the actuation cycle such that:

- in the first stage (2.1), one wall (e.g. wall W3) is actuated in the first direction while the second wall (e.g. wall W2) remains in the neutral position; and then.
- in the second stage (2.2), one wall (e.g. walls W2 and W4) is actuated in the first direction while the other wall (e.g. walls W3 and W5) is actuated in the second direction.

More generally, with regard to the steps of FIG. 11, the method comprises, for a given (single) actuation cycle, the steps of:

- receiving input data;
- assigning, based on said input data, all the fluid chambers within said array as either firing chambers or non-firing chambers so as to produce bands of one or more contiguous firing chambers separated by bands of one or more contiguous non-firing chambers; and
- applying the common potential to the second electrodes and, based on said input data, selectively applying either the first drive potential, the second drive potential or the common potential to the first electrodes to actuate the walls of said chambers such that:
- for at least a first firing chamber (e.g. chambers 1, 3 and 5),
- the first wall (walls W1, W3 and W5) of the or each first firing chamber is repeatedly actuated in the first direction and then the second direction, without stopping in the neutral position, while the second wall (walls W2, W4 and W6) of the or each first firing chamber is kept in the neutral position; and
- at a time in the actuation cycle at which one or more first firing chamber is to eject a droplet of the fluid therein, the second wall (walls W2, W4 and W6) of the respective first firing chamber(s) is selectively actuated in the first direction substantially concurrently with the actuating of the first wall of the firing chamber in the second direction, thereby causing the respective first firing chamber to eject a droplet of the fluid therein, and then the second wall (walls W2, W4 and W6) of the respective first firing chamber is returned to the neutral position. As mentioned above, the aforementioned "time in the actuation cycle" at which the selective actuation of the second wall(s) takes place may be immediately following the assignment of the firing chambers, before the completion of the first repeated actuation of the first wall, although preferably the first wall is repeatedly actuated at least once before the selective actuation of the second wall(s) takes place.

The or each first firing chamber may be a member of a first group of one or more firing chambers (chambers 1, 3 and 5) that are interleaved by respective firing chambers of a second group of one or more firing chambers (chambers 2 and 4), wherein the first wall (walls W1, W3 and W5) of each of the members of the first group of firing chambers are simultaneously repeatedly actuated in the first direction and then the second direction.

Figure 12:
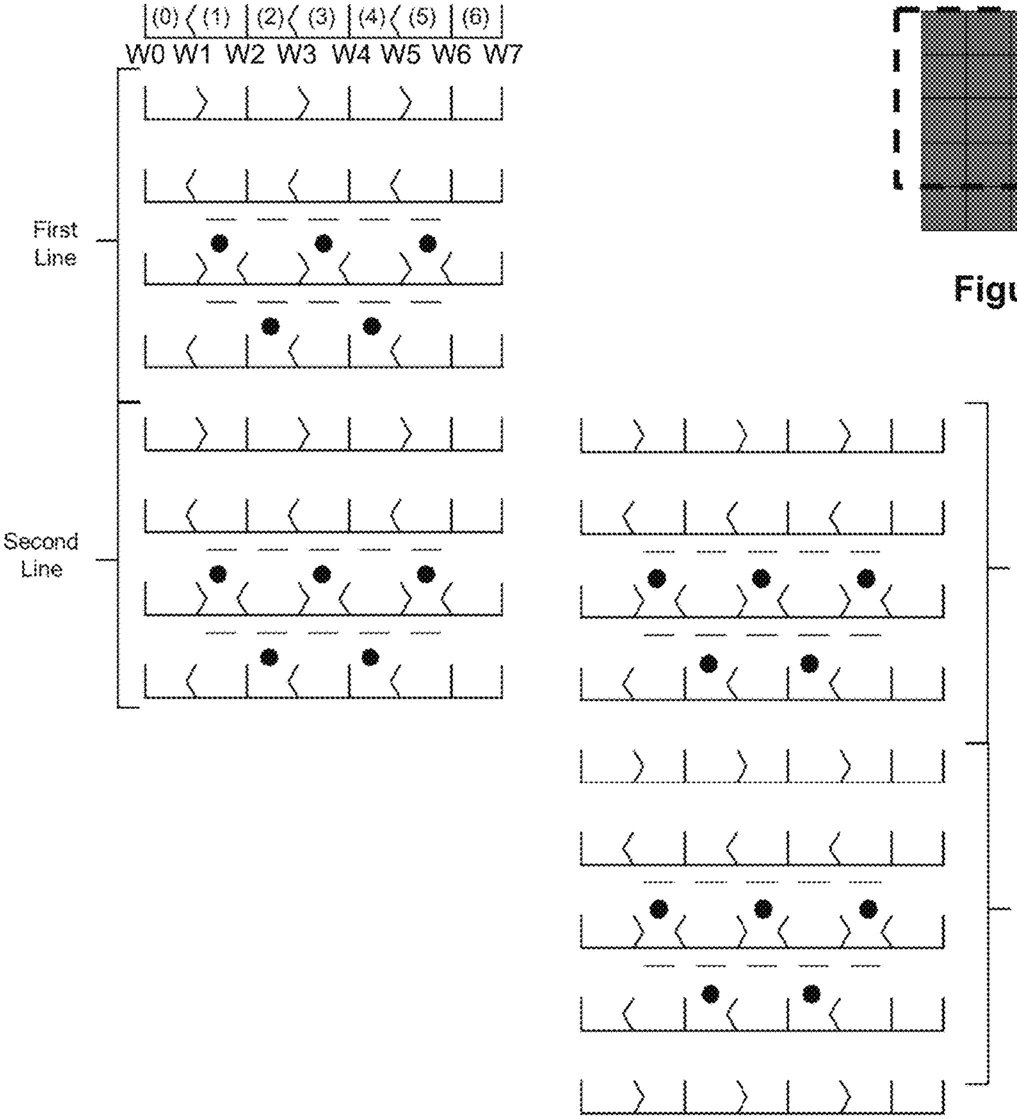
FIG. 12 illustrates the printing of a plurality of consecutive lines (in this case, four) using a band of a plurality of contiguous firing chambers.

Example of FIG. 12—Printing Multiple Lines

With reference now to FIG. 12, in the event that it is desired to print a series of five droplets from chambers 1 to 5, all the chambers from chamber 1 to chamber 5 will be assigned as firing chambers. In practice, though, the release of walls W2 and W4, and the movement in the first direction of walls W3 and W5, may or may not be enough to cause droplets to be ejected from chambers 2 and 4.

If the drive pulse applied across walls W2 and W4 has a sufficiently high potential difference to overcome the surface tension effects when these walls are released, a droplet will then be ejected from chambers 2 and 4. However this droplet may be expected to have variations in speed and/or volume causing the loss of printing uniformity.

Figure 13:
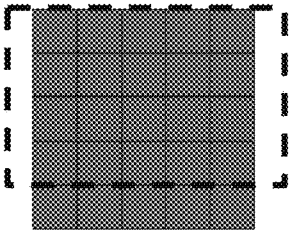
FIG. 13 illustrates a pattern of pixels to be printed, employing the printing mode of FIG. 12.

One way of solving this problem is to print droplets as a plurality of consecutive lines, as illustrated in FIG. 12, e.g. resulting in a pattern as shown in FIG. 13. This way the energy of the previous pulses would cause all chambers 1 to 5 to overcome the surface tension effects and fire as shown in FIG. 12. However, this may cause consecutive drops to merge in flight, again affecting print uniformity.

It should be noted that the wall motions described with reference to FIGS. 11 and 12 are identical. The droplets may be ejected from every other nozzle, or every nozzle. This may depend on the number of lines printed. This basic implementation, that is likely to result in non-uniform drop formation in the printhead, is improved upon in the more advanced techniques that will now be described with reference to FIGS. 14 to 19.

Figure 14:
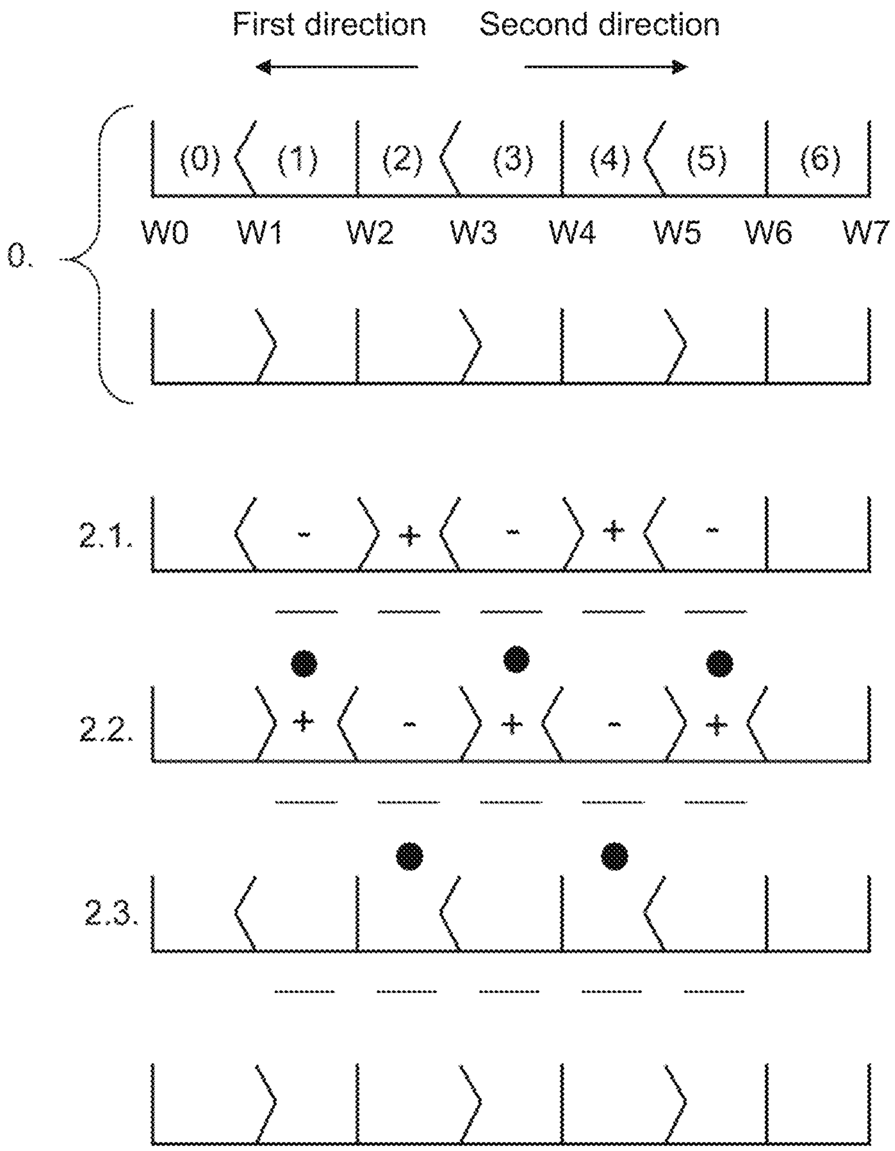
FIG. 14 illustrates a variant of the printing mode of FIG. 11, with some of the selectively-actuated walls being driven by a so-called "priming pulse" immediately prior to the time of droplet ejection.

Variant of FIG. 14, Employing a Priming Pulse

FIG. 14 illustrates a variant of the harmonic actuation mode of FIG. 11. In this example, a so-called "priming pulse" is included in the drive waveform to ensure distinct drop ejection.

As with the example of FIG. 11, in FIG. 14 the interleaving walls W1, W3 and W5 are actuated in a first direction and in a second direction (substantially) at the chambers' harmonic frequency. This movement is repeated and provides some energy to the system without ejecting a droplet (step 0 of FIGS. 11 and 14).

Figure 15:
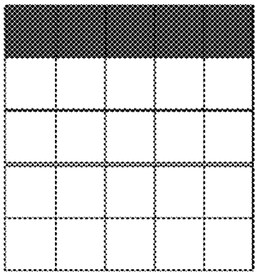
FIG. 15 illustrates a pattern of pixels to be printed, employing the printing mode of FIG. 14.

To eject, all the fluid chambers are assigned as either firing chambers (1, 2, 3, 4 and 5) or non-firing chambers (0 and 6). FIG. 14 shows the wall movements to eject one single line, resulting in a pattern as shown in FIG. 15.

To explain the effect of the priming pulse, attention is drawn to wall W2 (the second wall of the first firing chamber, chamber 1), which remained in the neutral position in stage 2.1 of FIG. 11, but which, in stage 2.1 of the variant of FIG. 14, is actuated (by means of the priming pulse) in the second direction concurrently with the actuation of the first wall (W1) of the first firing chamber in the first direction. This actuation of the second wall (W2) of the first firing chamber occurs immediately prior to stage 2.2 in which the first firing chamber ejects a droplet of the fluid therein. In effect, the actuation of wall W2 in stage 2.1 serves to prime the wall W2, so as to give it more energy when it is actuated to cause droplet ejection in stage 2.2. As a consequence, after stage 2.2, wall W2 still possesses enough energy to contribute effectively to successful droplet ejection in stage 2.3.

More particularly, the walls of each firing chamber (chambers 1 to 5) are actuated such that:

in the first stage (2.1):

walls W1, W3 and W5 are actuated in the first direction (substantially) at the chambers' harmonic frequency, providing some energy into the chamber; while walls W2 and W4 are actuated in the second direction due to the effect of the priming pulse, imparting the chambers with some priming energy;

in the second stage (2.2):

walls W1, W3 and W5 are actuated in the second direction (substantially) at the chambers' harmonic frequency; while walls W2, W4 and W6 are actuated in the first direction due to the effect of an ejection pulse in the drive waveform, substantially concurrently with the actuation of walls W1, W3 and W5 in the second direction, such that the energy necessary to eject all the droplets from all the firing chambers is added to the actuation cycle, decreasing the volume of firing chambers 1, 3 and 5, and forming a droplet for ejection at each of the corresponding nozzles;

in the third stage (2.3):

walls W1, W3 and W5 are actuated again in the first direction (substantially) at the chambers' harmonic frequency, providing some energy into the chambers; while walls W2, W4 and W6 are released and chambers 2 and 4 eject a droplet due to the priming energy previously imparted by the priming pulse; and.

after firing, walls W1, W3 and 5W are actuated again in the first direction and then the second direction (substantially) at the chambers' harmonic frequency, as shown in step 0.

As for each non-firing chambers, the walls are actuated such that:

one wall is actuated either in the first direction only (e.g. wall W6) or in both the first and second directions (e.g. wall W1) while the other wall remains stationary (e.g. walls W0 and W7); or.

both walls remain in the neutral position.

Figure 16:
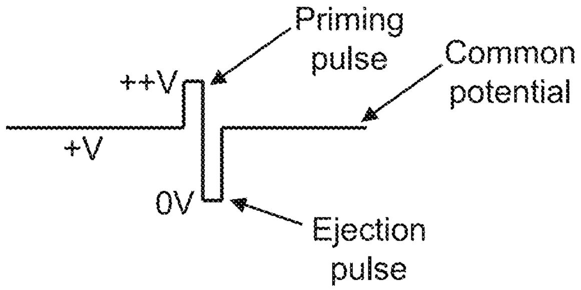
FIG. 16 illustrates an example of a drive waveform comprising a priming pulse immediately prior to an ejection pulse.

FIG. 16 illustrates an example drive waveform as may be applied to wall W2 in FIG. 14, for instance, comprising a priming pulse (a pulse of the "second drive potential", at a nominal level ++V, causing actuation in the second direction in stage 2.1) immediately prior to an ejection pulse (a pulse of the "first drive potential", at a nominal level of 0V, causing actuation in the first direction in stage 2.2), before returning to the common potential (at a nominal level +V).

From FIG. 16 it can be seen that, when delivering a priming pulse, the relative magnitudes of the second drive potential (++V), the first drive potential (0V) and the common potential (+V) may optionally be such that the difference between the second drive potential (++V) and the common potential (+V) is less than the difference between the common potential (+V) and the first drive potential (0V).

Figure 17:
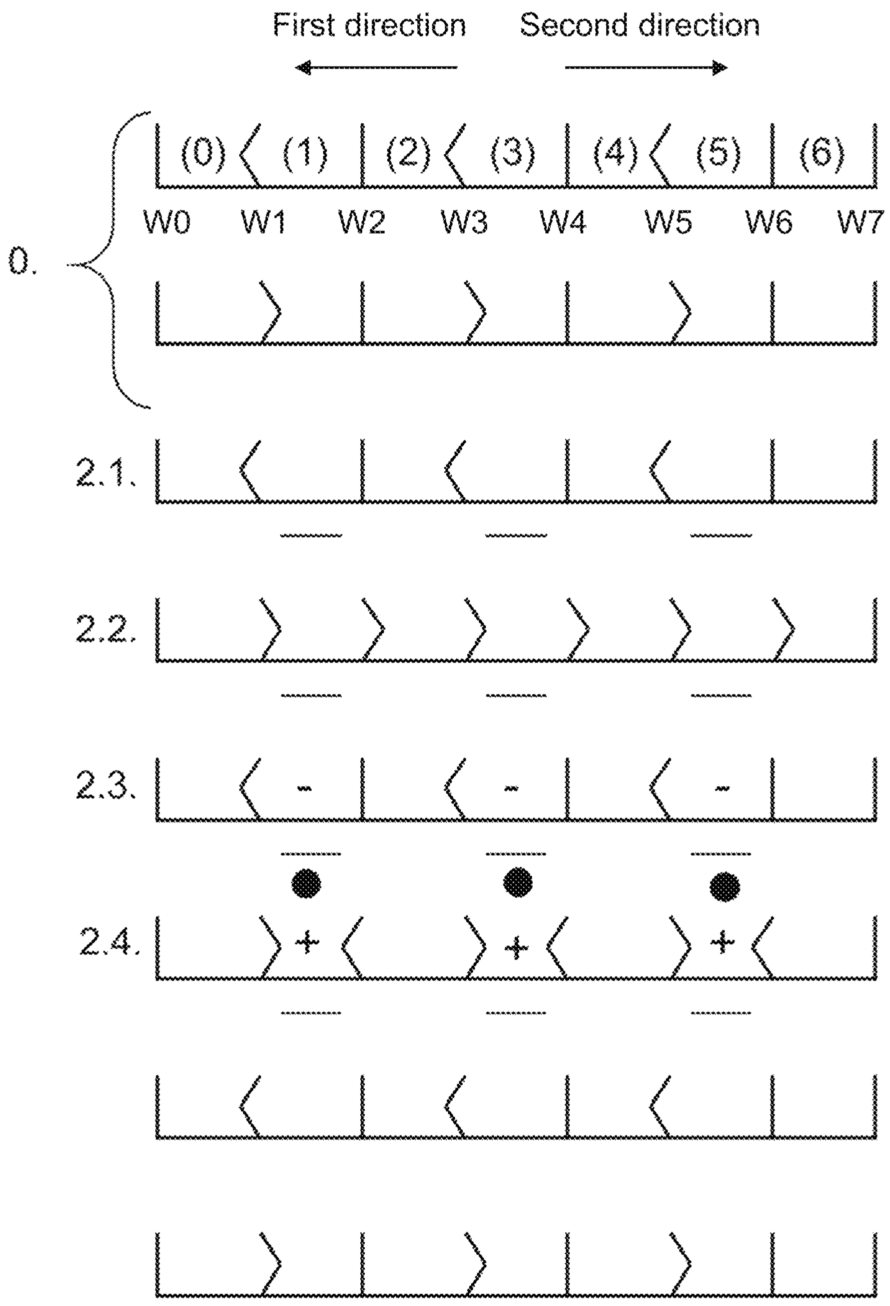
FIG. 17 illustrates another variant of the printing mode of FIG. 11, with some of the selectively-actuated walls being driven by a so-called "cancelation pulse" prior to the time of droplet ejection.
Figure 18:
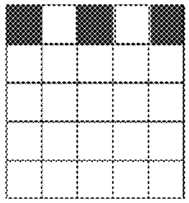
FIG. 18 illustrates a pattern of pixels to be printed, employing the printing mode of FIG. 17.

Variant of FIG. 17, Employing a Cancelation Pulse

FIG. 17 illustrates a variant of the harmonic actuation mode of FIG. 11. In this example, a so-called "cancelation pulse" is included in the drive waveform to ensure that only every other nozzle ejects a droplet.

As with the examples of FIGS. 11 and 14, in FIG. 17 the interleaving walls W1, W3 and W5 move in a first direction and in a second direction (substantially) at the chambers' harmonic frequency. This movement is repeated and provides some energy to the system without ejecting a droplet (step 0).

To eject, all fluid chambers are assigned as either firing chambers (1, 3 and 5) or non-firing chambers (0, 2, 4 and 6).

To explain the effect of the cancelation pulse, it should be noted that stages 2.3 and 2.4 of FIG. 17 correspond to stages 2.1 and 2.2 of FIG. 11. However, FIG. 17 additionally includes stages 2.1 and 2.2 (in the latter of which the cancelation pulse is delivered), which precede stages 2.3 and 2.4. Referring again to wall W2 (the second wall of the first firing chamber, chamber 1), in stage 2.2 of FIG. 17 the wall W2 is actuated (by means of the cancelation pulse) in the second direction concurrently with the actuation of the first wall (W1) of the first firing chamber in the second direction. This happens prior to stage 2.4 of FIG. 17 in which the first firing chamber ejects a droplet of the fluid therein. The same actuation happens in stage 2.2 with walls W3 and W4 of the next firing chamber, chamber 3, which is spaced apart from chamber 1 by a non-firing chamber, chamber 2; and with walls W5 and W6 of the next firing chamber, chamber 5, which is spaced apart from chamber 3 by another non-firing chamber, chamber 4. The effect of the cancelation pulse in stage 2.2 of FIG. 17 is to cause both walls of the non-firing chambers 2 and 4 to move in the same direction (i.e. the second direction) at the same time (i.e. in stage 2.2). This ensures that surface tension effects are not overcome in the non-firing chambers 2 and 4 during the rest of the actuation cycle. As a consequence, no droplet is ejected from the non-firing chambers 2 and 4 when a droplet is ejected from each of the firing chambers 1, 3, and 5 in stage 2.4.

More particularly, the walls of each chamber are actuated such that:

- in the first stage (2.1):
  - walls W1, W3 and W5 are actuated in the first direction (substantially) at the chambers' harmonic frequency; while
  - walls W2, W4 and W6 remain stationary;
- in the second stage (step 2.2):
  - walls W1 to W6 are all actuated in the second direction due to the effect of the cancelation pulse (which, more specifically, is applied to walls W2, W4 and W6, to ensure that no droplet is ejected from chambers 2, 4 and 6);
- in the third stage (2.3):
  - walls W1, W3 and W5 are actuated again in the first direction (substantially) at the chambers' harmonic frequency; while
  - walls W2, W4 and W6 and remain stationary;
- in the fourth stage (2.4):
  - walls W1, W3 and W5 are actuated again in the second direction (substantially) at the channels harmonic frequency; while
  - walls W2, W4 and W6 are actuated in the first direction due to the effect of an ejection pulse in the drive waveform, substantially concurrently with the actuation of walls W1, W3 and W5 in the second direction, such that the energy necessary to eject all the droplets from all the firing chambers is added to the actuation cycle, decreasing the volume of firing chambers 1, 3 and 5, and forming a droplet for ejection at each of the corresponding nozzles; and.
- after firing, walls W1, W3 and 5W are actuated again in the first direction and then the second direction (substantially) at the chambers' harmonic frequency, as shown in step 0.

Figure 19:
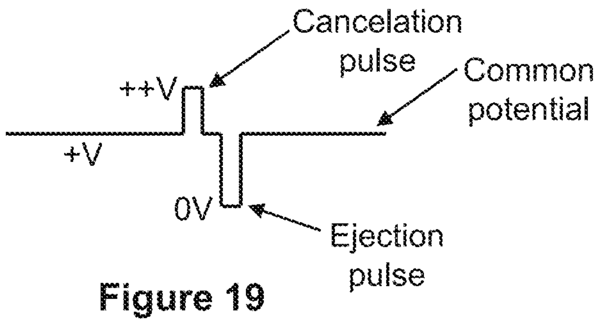
FIG. 19 illustrates an example of a drive waveform comprising a cancelation pulse prior to an ejection pulse.

FIG. 19 illustrates an example drive waveform as may be applied to wall W2 in FIG. 17, for instance, comprising a cancelation pulse (a pulse of the "second drive potential", at a nominal level ++V, causing actuation in the second direction in stage 2.2) prior to an ejection pulse (a pulse of the "first drive potential", at a nominal level of 0V, causing actuation in the first direction in stage 2.4), before returning to the common potential (at a nominal level +V). It can be seen that the drive waveform also returns to the common potential for a brief period between the cancelation pulse and the ejection pulse, the brief period corresponding to the duration of stage 2.3 in which wall W2 is temporarily in the neutral position, From FIG. 19 it can also be seen that, when delivering a cancelation pulse, the relative magnitudes of the second drive potential (++V), the first drive potential (0V) and the common potential (+V) may optionally be such that the difference between the second drive potential (++V) and the common potential (+V) is less than the difference between the common potential (+V) and the first drive potential (0V).

General Considerations

With all the printing modes described above, the droplet deposition apparatus (comprising one or more droplet deposition heads) may further comprise a computer in data communication with the droplet deposition head(s), wherein said computer is programmed to carry out the assigning step based on input data. The computer may be further programmed to provide instructions to the droplet deposition head(s), so as to cause them to carry out the actuating steps.

Alternatively, or in addition, the or each droplet deposition head may be equipped with an onboard processor programmed to carry out said assigning step based on said input data.

A computer program may be provided comprising instructions to cause the droplet deposition head, or the droplet deposition apparatus, to execute the printing method in question.

Further details of how a droplet deposition head may be controlled in response to supplied image data, and in respect of the generation of drive waveforms that are used to provide the potential signals to actuate the walls of the firing chambers, are provided for example in WO 2018/224821 A9.

It will be appreciated that, depending on the application, a variety of fluids may be deposited using the methods and droplet deposition heads described herein.

For instance, a droplet deposition head may eject droplets of ink that may travel to a sheet of paper or card, or to other receiving media, such as ceramic tiles or shaped articles (e.g. cans, bottles etc.), to form an image, as is the case in inkjet printing applications (where the droplet deposition head may be an inkjet printhead or, more particularly, a drop-on-demand inkjet printhead).

Alternatively, droplets of fluid may be used to build structures. For example, electrically active fluids may be deposited onto receiving media such as a circuit board so as to enable prototyping of electrical devices.

In another example, polymer containing fluids or molten polymer may be deposited in successive layers so as to produce a prototype model of an object (as in 3D printing).

In still other applications, droplet deposition heads might be adapted to deposit droplets of solution containing biological or chemical material onto a receiving medium such as a microarray.

Droplet deposition heads suitable for such alternative fluids may be generally similar in construction to printheads, with some adaptations made to handle the specific fluid in question.

Droplet deposition heads as described herein may be drop-on-demand droplet deposition heads. In such heads, the pattern of droplets ejected varies in dependence upon the input data provided to the head.

With all the printing modes described above, the potential differences applied across the chamber walls may be altered to "fine tune" properties (such as the volume and/or velocity) of the ejected droplets. Moreover, additional wall motions of different amplitudes may also, or instead, be used to "fine tune" such properties of the ejected droplets.

Further, in the example drive waveforms given above, the potential levels that are applied to the electrodes on the chamber walls are described as being positive (e.g. +V or ++V) or zero/ground potential. However, it is possible for one or more of the drive potential(s) and the common potential to take negative values, if the drive electronics permit—provided of course that the relative relationships of the drive potential(s) and the common potential result in the required actuation behaviour of the walls (with the common potential being between the first drive potential and the second drive potential, if two such drive potentials are being used to enable bidirectional actuation of the walls).

Finally, it should be noted that a wide range of examples and variations are contemplated within the scope of the appended claims. Accordingly, the foregoing description should be understood as providing a number of non-limiting examples that assist the skilled reader's understanding of the present invention and that demonstrate how the present invention may be implemented.

The invention claimed is:

1. A method for depositing droplets of fluid onto a medium utilising a droplet deposition head, the droplet deposition head comprising:

an array of fluid chambers separated by interspersed walls formed of a piezoelectric material, each fluid chamber communicating with an aperture for the release of droplets of fluid, each of said walls separating two neighbouring fluid chambers, and each fluid chamber being defined by a first wall in a first direction relative to the fluid chamber, and a second wall in a second direction relative to the fluid chamber, the second direction being opposite to the first direction;

wherein each of said walls has a first electrode on a first side of the wall and a second electrode on a second side of the wall, wherein the second electrode of each of the walls is connected to a common potential, and wherein the first electrode of each of the walls is selectively settable to one of (a) a drive potential that is different from the common potential, and (b) the common potential;

wherein each of said walls is actuable such that, in response to the application of the drive potential to the respective first electrode, the respective wall will move in the first direction from a neutral position into a deformed position, and in response to the application of the common potential to the respective first electrode, the respective wall will return to, or remains in, the neutral position;

the method comprising, for an actuation cycle, the steps of:

receiving input data;

assigning, based on said input data, all the fluid chambers within said array as either firing chambers or non-firing chambers so as to produce bands of one or more contiguous firing chambers separated by bands of one or more contiguous non-firing chambers; and applying the common potential to the second electrodes and, based on said input data, selectively applying either the drive potential or the common potential to the first electrodes to actuate the walls of said chambers such that:

for each non-firing chamber, if the non-firing chamber is adjacent to a band of firing chambers, one wall is actuated in the first direction while the other wall remains in the neutral position, if the non-firing chamber is a single non-firing chamber between bands of firing chambers, both walls are actuated concurrently in the first direction, and if the non-firing chamber is not adjacent to a band of firing chambers, both walls either remain in the neutral position, or are actuated concurrently in the first direction, or are actuated concurrently in the second direction; and for each firing chamber, each of the first and second walls are actuated consecutively in the first direction;

said actuations during the actuation cycle resulting in each said firing chamber of the band of one or more contiguous firing chambers releasing at least one droplet, the resulting droplets forming bodies of fluid disposed on a line on said medium, said bodies of fluid being separated on said line by respective gaps for each of said bands of non-firing chambers, the size of each such gap generally corresponding in size to the respective band of non-firing chambers.

2. The method according to claim 1, wherein, for a first firing chamber, the method comprises, in the actuation cycle:

actuating the first wall of the first firing chamber in the first direction while the second wall of the first firing chamber remains in the neutral position, thereby increasing the volume of the first firing chamber and causing it to draw in a quantity of fluid, and then returning the first wall of the first firing chamber to the neutral position; and then actuating the second wall of the first firing chamber in the first direction while the first wall of the first firing chamber remains in the neutral position, thereby decreasing the volume of the first firing chamber and causing the first firing chamber to eject a droplet of the fluid therein, and then returning the second wall of the first firing chamber to the neutral position.

3. The method according to claim 2, wherein a second firing chamber is adjacent to the first firing chamber, the second firing chamber being in the second direction relative to the first firing chamber such that the second wall of the first firing chamber is the first wall of the second firing chamber, wherein, in the actuation cycle, the said actuating of the second wall of the first firing chamber in the first direction is performed while the second wall of the second firing chamber remains in the neutral position, thereby increasing the volume of the second firing chamber and causing the second firing chamber to draw in a quantity of fluid concurrently with the ejection of the droplet from the first firing chamber.

4. The method according to claim 3, wherein, in the actuation cycle, the said returning of the second wall of the first firing chamber to the neutral position causes the ejection of a droplet of the fluid from within the second firing chamber;

or wherein the method further comprises, in the actuation cycle, actuating the second wall of the second firing chamber in the first direction while the first wall of the second firing chamber remains in the neutral position, thereby decreasing the volume of the second firing chamber to cause the second firing chamber to eject a droplet of the fluid therein, and then returning the second wall of the second firing chamber to the neutral position.

5. The method according to claim 1, wherein, for a first band of firing chambers and a second band of firing chambers separated by a single non-firing chamber, the non-firing chamber being in the second direction relative to the first band of firing chambers, and the second band of firing chambers being in the second direction relative to the non-firing chamber, such that, of the first band of firing chambers, the second wall of a first firing chamber that is adjacent the non-firing chamber is the first wall of the non-firing chamber, and of the second band of firing chambers, the first wall of a second firing chamber that is adjacent the non-firing chamber is the second wall of the non-firing chamber, the method comprises, in the actuation cycle:

actuating the first wall of the first firing chamber in the first direction while the second wall of the first firing chamber remains in the neutral position, and then returning the first wall of the first firing chamber to the neutral position; and then actuating the second wall of the first firing chamber and the first wall of the second firing chamber concurrently in the first direction while the second wall of the second firing chamber remains in the neutral position, thereby causing the first firing chamber to eject a droplet of the fluid therein, and then returning the second wall of the first firing chamber and the first wall of the second firing chamber to the neutral position; and then actuating the second wall of the second firing chamber in the first direction while the first wall of the second firing chamber remains in the neutral position, thereby causing the second firing chamber to eject a droplet of the fluid therein, and then returning the second wall of the second firing chamber to the neutral position.

6. The method according to any preceding claim 1, wherein the common potential is ground potential or OV, or wherein the common potential is a positive potential greater than ground potential; and/or wherein the drive potential is greater than the common potential.

7. A method for depositing droplets of fluid onto a medium utilising a droplet deposition head, the droplet deposition head comprising:

an array of fluid chambers separated by interspersed walls formed of a piezoelectric material, each fluid chamber communicating with an aperture for the release of droplets of fluid, each of said walls separating two neighbouring fluid chambers, and each fluid chamber being defined by a first wall in a first direction relative to the fluid chamber, and a second wall in a second direction relative to the fluid chamber, the second direction being opposite to the first direction;

wherein each of said walls has a first electrode on a first side of the wall and a second electrode on a second side of the wall, wherein the second electrode of each of the walls is connected to a common potential, and wherein the first electrode of each of the walls is selectively settable to one of (a) a drive potential that is different from the common potential, and (b) the common potential;

wherein each of said walls is actuable such that, in response to the application of the drive potential to the respective first electrode, the respective wall will move in the first direction from a neutral position into a deformed position, and in response to the application of the common potential to the respective first electrode, the respective wall will return to, or remains in, the neutral position;

the method comprising, for an actuation cycle, the steps of:

receiving input data;

assigning, based on said input data, all the fluid chambers within said array as either firing chambers or non-firing chambers so as to produce bands of one or more contiguous firing chambers separated by bands of one or more contiguous non-firing chambers; and applying the common potential to the second electrodes and, based on said input data, selectively applying either the drive potential or the common potential to the first electrodes to actuate the walls of said chambers such that:

for at least a first firing chamber, the first wall of the first firing chamber is repeatedly actuated in the first direction and then returned to the neutral position while the second wall of the first firing chamber is kept in the neutral position; and at a time in the actuation cycle at which the first firing chamber is to eject a droplet of the fluid therein, the second wall of the first firing chamber is selectively actuated in the first direction substantially concurrently with the returning of the first wall of the first firing chamber to the neutral position, thereby causing the first firing chamber to eject a droplet of the fluid therein, and then the second wall of the first firing chamber is returned to the neutral position;

said actuations during the actuation cycle resulting in each said firing chamber of the band of one or more contiguous firing chambers releasing at least one droplet, the resulting droplets forming bodies of fluid disposed on a line on said medium, said bodies of fluid being separated on said line by respective gaps for each of said bands of non-firing chambers, the size of each such gap generally corresponding in size to the respective band of non-firing chambers.

8. The method according to claim 7, wherein the first firing chamber is a member of a first group of firing chambers that are interleaved by respective firing chambers of a second group of one or more firing chambers, and wherein the first wall of each of the members of the first group of firing chambers are simultaneously repeatedly actuated in the first direction and then returned to the neutral position.

9. The method according to claim 7, wherein a second firing chamber that is a member of the second group of firing chambers is adjacent the first firing chamber, the second firing chamber being in the second direction relative to the first firing chamber such that the second wall of the first firing chamber is the first wall of the second firing chamber, and wherein the method further comprises, in the actuation cycle:

keeping the second wall of the second firing chamber in the neutral position while the second wall of the first firing chamber is actuated to eject said droplet of the fluid therein; and then actuating the second wall of the second firing chamber in the first direction substantially concurrently with the first wall of the second firing chamber being in the neutral position, thereby causing the second firing chamber to eject a droplet of the fluid therein, and then returning the second wall of the second firing chamber to the neutral position;

optionally wherein the second wall of the second firing chamber is repeatedly actuated in the first direction and returned to the neutral position in synchronicity with the repeated actuation of the first wall of the first firing chamber.

10. The method according to claim 7, wherein, in the actuation cycle, for each non-firing chamber, if the non-firing chamber is a single non-firing chamber between bands of firing chambers, both walls are actuated concurrently in the first direction, otherwise one wall is actuated in the first direction while the other wall remains in the neutral position, or both walls remain in the neutral position.

11. The method according to claim 7, wherein the repeatedly-actuated wall(s) are actuated one or more times before the step of assigning, based on said input data, all the fluid chambers within said array as either firing chambers or non-firing chambers;

or wherein the first wall of the or each firing chamber is actuated at substantially the resonant frequency of the firing chambers, or at substantially a harmonic or subharmonic of the resonant frequency of the firing chambers.

12. The method according to claim 7, wherein the common potential is ground potential or OV, or wherein the common potential is a positive potential greater than ground potential; and/or wherein the drive potential is greater than the common potential.

13. A method for depositing droplets of fluid onto a medium utilising a droplet deposition head, the droplet deposition head comprising:

an array of fluid chambers separated by interspersed walls formed of a piezoelectric material, each fluid chamber communicating with an aperture for the release of droplets of fluid, each of said walls separating two neighbouring fluid chambers, and each fluid chamber being defined by a first wall in a first direction relative to the fluid chamber, and a second wall in a second direction relative to the fluid chamber, the second direction being opposite to the first direction;

wherein each of said walls has a first electrode on a first side of the wall and a second electrode on a second side of the wall, wherein the second electrode of each of the walls is connected to a common potential, and wherein the first electrode of each of the walls is selectively settable to one of (a) a first drive potential, (b) a second drive potential, and (c) the common potential, the common potential being between the first drive potential and the second drive potential;

wherein each of said walls is actuable such that, in response to the application of the first drive potential to the respective first electrode, the respective wall will move in the first direction from a neutral position into a deformed position, in response to the application of the second drive potential to the respective first electrode, the respective wall will move in the second direction from the neutral position into a deformed position, and in response to the application of the common potential to the respective first electrode, the respective wall will return to, or will remain in, the neutral position;

the method comprising, for an actuation cycle, the steps of:

receiving input data;

assigning, based on said input data, all the fluid chambers within said array as either firing chambers or non-firing chambers so as to produce bands of one or more contiguous firing chambers separated by bands of one or more contiguous non-firing chambers; and applying the common potential to the second electrodes and, based on said input data, selectively applying either the first drive potential, the second drive potential or the common potential to the first electrodes to actuate the walls of said chambers such that:

for at least a first firing chamber, the first wall of the first firing chamber is repeatedly actuated in the first direction and then the second direction while the second wall of the first firing chamber is kept in the neutral position; and at a time in the actuation cycle at which the first firing chamber is to eject a droplet of the fluid therein, the second wall of the first firing chamber is selectively actuated in the first direction substantially concurrently with the actuating of the first wall of the firing chamber in the second direction, thereby causing the first firing chamber to eject a droplet of the fluid therein, and then the second wall of the first firing chamber is returned to the neutral position;

said actuations during the actuation cycle resulting in each said firing chamber of the band of one or more contiguous firing chambers releasing at least one droplet, the resulting droplets forming bodies of fluid disposed on a line on said medium, said bodies of fluid being separated on said line by respective gaps for each of said bands of non-firing chambers, the size of each such gap generally corresponding in size to the respective band of non-firing chambers.

14. The method according to claim 13, wherein the first firing chamber is a member of a first group of firing chambers that are interleaved by respective firing chambers of a second group of one or more firing chambers, and wherein the first wall of each of the members of the first group of firing chambers are simultaneously repeatedly actuated in the first direction and then the second direction.

15. The method according to claim 13, wherein, in the actuation cycle, for each non-firing chamber, the walls are actuated such that:

if the band of non-firing chambers is not a single non-firing chamber in between bands of firing chambers, one wall is actuated either in the first direction only or in both the first and second directions while the other wall remains in the neutral position; or both walls remain in the neutral position;

or wherein, in the actuation cycle, for each non-firing chamber, the walls are actuated such that:

if a single non-firing chamber is between bands of firing chambers:

one wall is actuated in the first direction while the second wall remains in the neutral position; and then one wall is actuated in the first direction while the other wall is actuated in the second direction.

16. The method according to claim 15, wherein, for a band of a plurality of contiguous firing chambers, the firing chambers are actuated to deposit droplets as a plurality of consecutive lines.

17. The method according to claim 13, wherein the second wall of the first firing chamber is actuated in the second direction concurrently with an actuation of the first wall of the first firing chamber in the first direction, immediately prior to the time in the actuation cycle at which the first firing chamber is to eject a droplet of the fluid therein;

or wherein the second wall of the first firing chamber is actuated in the second direction concurrently with an actuation of the first wall of the first firing chamber in the second direction, prior to the time in the actuation cycle at which the first firing chamber is to eject a droplet of the fluid therein.

18. The method according to claim 17, wherein said actuation of the second wall of the first firing chamber in the second direction is performed by applying a second drive potential to the first electrode of the second wall of the first firing chamber, the second drive potential being such that the difference between the second drive potential and the common potential is less than the difference between the common potential and the first drive potential.

19. The method according to claim 13, wherein the common potential is a positive potential greater than ground potential;

optionally wherein the first drive potential is greater than the common potential and the second drive potential is less than the common potential;

optionally wherein the second drive potential is ground potential or OV.

20. The method according to claim 13, wherein the repeatedly-actuated wall(s) are actuated one or more times before the step of assigning, based on said input data, all the fluid chambers within said array as either firing chambers or non-firing chambers;

or wherein the first wall of the or each firing chamber is actuated at substantially the resonant frequency of the firing chambers, or at substantially a harmonic or subharmonic of the resonant frequency of the firing chambers.

* * * * *